(12) United States Patent
Svendsen

(10) Patent No.: US 7,970,922 B2
(45) Date of Patent: Jun. 28, 2011

(54) P2P REAL TIME MEDIA RECOMMENDATIONS

(75) Inventor: Hugh Svendsen, Chapel Hill, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 135 days.

(21) Appl. No.: 12/195,628

(22) Filed: Aug. 21, 2008

(65) Prior Publication Data

US 2008/0319833 A1    Dec. 25, 2008

Related U.S. Application Data

(63) Continuation-in-part of application No. 11/484,130, filed on Jul. 11, 2006, now Pat. No. 7,680,959.

(51) Int. Cl.
*G06F 15/16* (2006.01)
(52) U.S. Cl. ........................ 709/231; 709/204
(58) Field of Classification Search .................. 709/200, 709/203, 204, 205, 217–219, 230, 231; 707/748, 707/752–754
See application file for complete search history.

(56) References Cited

U.S. PATENT DOCUMENTS

| | | | |
|---|---|---|---|
| 4,870,579 A | 9/1989 | Hey | |
| 5,621,456 A | 4/1997 | Florin et al. | |
| 5,771,778 A | 6/1998 | MacLean, IV | |
| 5,956,027 A | 9/1999 | Krishnamurthy | |
| 5,960,437 A | 9/1999 | Krawchuk et al. | |
| 5,963,916 A | 10/1999 | Kaplan | |
| 6,134,552 A | 10/2000 | Fritz et al. | |
| 6,195,657 B1 | 2/2001 | Rucker et al. | |
| 6,266,649 B1 | 7/2001 | Linden et al. | |
| 6,314,420 B1 | 11/2001 | Lang et al. | |
| 6,317,722 B1 | 11/2001 | Jacobi et al. | |
| 6,353,823 B1 | 3/2002 | Kumar | |
| 6,388,714 B1 | 5/2002 | Schein et al. | |
| 6,438,579 B1 | 8/2002 | Hosken | |
| 6,498,955 B1 | 12/2002 | McCarthy et al. | |

(Continued)

FOREIGN PATENT DOCUMENTS

CN    1208930 A    2/1999

(Continued)

OTHER PUBLICATIONS

"UpTo11.net—Music Recommendations and Search," http://www.upto11.net/, copyright 2005-2006 Upto11.net, printed Feb. 7, 2007, 1 page.

(Continued)

*Primary Examiner* — Faruk Hamza
(74) *Attorney, Agent, or Firm* — Withrow & Terranova, PLLC

(57) ABSTRACT

Systems and methods are described for providing peer-to-peer (P2P) media recommendations. In one embodiment, a central streaming media service operates to stream media presentations to user devices of users. For each user desiring to send and receive recommendations, each time a media presentation is streamed to and played by a user device of the user, the central media service provides a recommendation identifying the media presentation to one or more other users associated with the user. Similarly, the central media service provides media recommendations to the user from one or more other users. Once streaming and playback of the media presentation is complete or substantially complete, the central streaming media service automatically selects a next media presentation for the user from a group of media presentations including those identified by the recommendations provided to the user and begins streaming the next media presentation to the user device of the user.

26 Claims, 17 Drawing Sheets

U.S. PATENT DOCUMENTS

| | | |
|---|---|---|
| 6,526,411 B1 | 2/2003 | Ward |
| 6,567,797 B1 | 5/2003 | Schuetze et al. |
| 6,587,127 B1 | 7/2003 | Leeke et al. |
| 6,587,850 B2 | 7/2003 | Zhai |
| 6,609,253 B1 | 8/2003 | Swix et al. |
| 6,615,208 B1 | 9/2003 | Behrens et al. |
| 6,629,104 B1 | 9/2003 | Parulski et al. |
| 6,636,836 B1 | 10/2003 | Pyo |
| 6,654,786 B1 | 11/2003 | Fox et al. |
| 6,662,231 B1 | 12/2003 | Drosset et al. |
| 6,670,537 B2 | 12/2003 | Hughes et al. |
| 6,694,482 B1 | 2/2004 | Arellano et al. |
| 6,757,517 B2 | 6/2004 | Chang |
| 6,757,691 B1 | 6/2004 | Welsh et al. |
| 6,801,909 B2 | 10/2004 | Delgado et al. |
| 6,865,565 B2 | 3/2005 | Rainsberger et al. |
| 6,904,264 B1 | 6/2005 | Frantz |
| 6,912,528 B2 | 6/2005 | Homer |
| 6,941,275 B1 | 9/2005 | Swierczek |
| 6,941,324 B2 | 9/2005 | Plastina et al. |
| 6,947,922 B1 | 9/2005 | Glance |
| 6,973,475 B2 | 12/2005 | Kenyon et al. |
| 6,976,228 B2 | 12/2005 | Bernhardson |
| 6,986,136 B2 | 1/2006 | Simpson et al. |
| 6,987,221 B2 | 1/2006 | Platt |
| 6,990,453 B2 | 1/2006 | Wang et al. |
| 7,013,301 B2 | 3/2006 | Holm et al. |
| 7,035,871 B2 | 4/2006 | Hunt et al. |
| 7,047,406 B2 | 5/2006 | Schleicher et al. |
| 7,072,846 B1 | 7/2006 | Robinson |
| 7,072,886 B2 | 7/2006 | Salmenkaita et al. |
| 7,075,000 B2 | 7/2006 | Gang et al. |
| 7,076,553 B2 | 7/2006 | Chan et al. |
| 7,089,248 B1 | 8/2006 | King et al. |
| 7,096,234 B2 | 8/2006 | Plastina et al. |
| 7,120,619 B2 | 10/2006 | Drucker et al. |
| 7,139,757 B1 | 11/2006 | Apollonsky et al. |
| 7,145,678 B2 | 12/2006 | Simpson et al. |
| 7,171,174 B2 | 1/2007 | Ellis et al. |
| 7,177,872 B2 | 2/2007 | Schwesig et al. |
| 7,219,145 B2 | 5/2007 | Chmaytelli et al. |
| 7,222,187 B2 | 5/2007 | Yeager et al. |
| 7,240,358 B2 | 7/2007 | Horn et al. |
| 7,283,992 B2 | 10/2007 | Liu et al. |
| 7,296,032 B1 | 11/2007 | Beddow |
| 7,305,449 B2 | 12/2007 | Simpson et al. |
| 7,340,481 B1 | 3/2008 | Baer et al. |
| 7,437,364 B1 | 10/2008 | Fredricksen et al. |
| 7,441,041 B2 | 10/2008 | Williams et al. |
| 7,444,339 B2 | 10/2008 | Matsuda et al. |
| 7,463,890 B2 | 12/2008 | Herz et al. |
| 7,496,623 B2 | 2/2009 | Szeto et al. |
| 7,509,291 B2 | 3/2009 | McBride et al. |
| 7,512,658 B2 | 3/2009 | Brown et al. |
| 7,548,915 B2 | 6/2009 | Ramer et al. |
| 7,590,546 B2 | 9/2009 | Chuang |
| 7,594,246 B1 | 9/2009 | Billmaier et al. |
| 7,614,006 B2 | 11/2009 | Molander |
| 7,623,843 B2 | 11/2009 | Squibbs |
| 7,627,644 B2 | 12/2009 | Slack-Smith |
| 7,644,166 B2 | 1/2010 | Appelman et al. |
| 7,653,654 B1 | 1/2010 | Sundaresan |
| 7,676,753 B2 | 3/2010 | Bedingfield |
| 7,680,959 B2 | 3/2010 | Svendsen |
| 7,720,871 B2 | 5/2010 | Rogers et al. |
| 7,725,494 B2 | 5/2010 | Rogers et al. |
| 7,730,216 B1 | 6/2010 | Issa et al. |
| 7,751,773 B2 | 7/2010 | Linden |
| 7,761,399 B2 | 7/2010 | Evans |
| 7,805,129 B1 | 9/2010 | Issa et al. |
| 7,865,522 B2 * | 1/2011 | Purdy et al. ............... 707/790 |
| 2001/0013009 A1 | 8/2001 | Greening et al. |
| 2001/0021914 A1 | 9/2001 | Jacobi et al. |
| 2001/0025259 A1 | 9/2001 | Rouchon |
| 2002/0052207 A1 | 5/2002 | Hunzinger |
| 2002/0052674 A1 | 5/2002 | Chang et al. |
| 2002/0052873 A1 | 5/2002 | Delgado et al. |
| 2002/0082901 A1 | 6/2002 | Dunning et al. |
| 2002/0087382 A1 | 7/2002 | Tiburcio |
| 2002/0103796 A1 | 8/2002 | Hartley |
| 2002/0108112 A1 | 8/2002 | Wallace et al. |
| 2002/0116533 A1 | 8/2002 | Holliman et al. |
| 2002/0138836 A1 | 9/2002 | Zimmerman |
| 2002/0165793 A1 | 11/2002 | Brand et al. |
| 2002/0178057 A1 | 11/2002 | Bertram et al. |
| 2002/0194325 A1 | 12/2002 | Chmaytelli et al. |
| 2003/0001907 A1 | 1/2003 | Bergsten et al. |
| 2003/0005074 A1 | 1/2003 | Herz et al. |
| 2003/0014407 A1 | 1/2003 | Blatter et al. |
| 2003/0014759 A1 * | 1/2003 | Van Stam ............... 725/97 |
| 2003/0018799 A1 | 1/2003 | Eyal |
| 2003/0046399 A1 | 3/2003 | Boulter et al. |
| 2003/0055516 A1 | 3/2003 | Gang et al. |
| 2003/0055657 A1 | 3/2003 | Yoshida et al. |
| 2003/0066068 A1 | 4/2003 | Gutta et al. |
| 2003/0069806 A1 | 4/2003 | Konomi et al. |
| 2003/0084044 A1 | 5/2003 | Simpson et al. |
| 2003/0084086 A1 | 5/2003 | Simpson et al. |
| 2003/0084151 A1 | 5/2003 | Simpson et al. |
| 2003/0089218 A1 | 5/2003 | Gang et al. |
| 2003/0097186 A1 | 5/2003 | Gutta et al. |
| 2003/0115167 A1 | 6/2003 | Sharif et al. |
| 2003/0135513 A1 | 7/2003 | Quinn et al. |
| 2003/0149581 A1 | 8/2003 | Chaudhri et al. |
| 2003/0149612 A1 | 8/2003 | Berghofer et al. |
| 2003/0153338 A1 | 8/2003 | Herz et al. |
| 2003/0160770 A1 | 8/2003 | Zimmerman |
| 2003/0191753 A1 | 10/2003 | Hoch |
| 2003/0229537 A1 | 12/2003 | Dunning et al. |
| 2003/0232614 A1 | 12/2003 | Squibbs |
| 2003/0236582 A1 | 12/2003 | Zamir et al. |
| 2003/0237093 A1 | 12/2003 | Marsh |
| 2004/0003392 A1 | 1/2004 | Trajkovic et al. |
| 2004/0019497 A1 | 1/2004 | Volk et al. |
| 2004/0034441 A1 | 2/2004 | Eaton et al. |
| 2004/0073919 A1 | 4/2004 | Gutta |
| 2004/0088271 A1 | 5/2004 | Cleckler |
| 2004/0091235 A1 | 5/2004 | Gutta |
| 2004/0107821 A1 | 6/2004 | Alcalde et al. |
| 2004/0128286 A1 | 7/2004 | Yasushi et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0162783 A1 | 8/2004 | Gross |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0215793 A1 | 10/2004 | Ryan et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0260778 A1 | 12/2004 | Banister et al. |
| 2004/0267604 A1 | 12/2004 | Gross |
| 2005/0020223 A1 | 1/2005 | Ellis et al. |
| 2005/0021420 A1 | 1/2005 | Michelitsch et al. |
| 2005/0021678 A1 | 1/2005 | Simyon et al. |
| 2005/0022239 A1 * | 1/2005 | Meuleman ............... 725/46 |
| 2005/0026559 A1 | 2/2005 | Khedouri |
| 2005/0038819 A1 | 2/2005 | Hicken et al. |
| 2005/0038876 A1 | 2/2005 | Chaudhuri |
| 2005/0060264 A1 | 3/2005 | Schrock et al. |
| 2005/0060666 A1 | 3/2005 | Hoshino et al. |
| 2005/0065976 A1 | 3/2005 | Holm et al. |
| 2005/0071418 A1 | 3/2005 | Kjellberg et al. |
| 2005/0091107 A1 | 4/2005 | Blum |
| 2005/0120053 A1 | 6/2005 | Watson |
| 2005/0125221 A1 | 6/2005 | Brown et al. |
| 2005/0125222 A1 | 6/2005 | Brown et al. |
| 2005/0131866 A1 | 6/2005 | Badros |
| 2005/0138198 A1 | 6/2005 | May |
| 2005/0154608 A1 | 7/2005 | Paulson et al. |
| 2005/0154764 A1 | 7/2005 | Riegler et al. |
| 2005/0154767 A1 | 7/2005 | Sako |
| 2005/0158028 A1 | 7/2005 | Koba |
| 2005/0166245 A1 | 7/2005 | Shin et al. |

| | | |
|---|---|---|
| 2005/0197961 A1 | 9/2005 | Miller et al. |
| 2005/0228830 A1 | 10/2005 | Plastina et al. |
| 2005/0246391 A1 | 11/2005 | Gross |
| 2005/0251455 A1 | 11/2005 | Boesen |
| 2005/0251807 A1 | 11/2005 | Weel |
| 2005/0256756 A1 | 11/2005 | Lam et al. |
| 2005/0256866 A1 | 11/2005 | Lu et al. |
| 2005/0267944 A1 | 12/2005 | Little, II |
| 2005/0278377 A1 | 12/2005 | Mirrashidi et al. |
| 2005/0278758 A1 | 12/2005 | Bodlaender |
| 2005/0286546 A1 | 12/2005 | Bassoli et al. |
| 2005/0289236 A1 | 12/2005 | Hull et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0015378 A1 | 1/2006 | Mirrashidi et al. |
| 2006/0020662 A1 | 1/2006 | Robinson |
| 2006/0026048 A1 | 2/2006 | Kolawa et al. |
| 2006/0048059 A1 | 3/2006 | Etkin |
| 2006/0053080 A1 | 3/2006 | Edmonson et al. |
| 2006/0064716 A1 | 3/2006 | Sull et al. |
| 2006/0074750 A1 | 4/2006 | Clark et al. |
| 2006/0083119 A1 | 4/2006 | Hayes |
| 2006/0085383 A1 | 4/2006 | Mantle et al. |
| 2006/0100924 A1 | 5/2006 | Tevanian, Jr. |
| 2006/0126135 A1 | 6/2006 | Stevens et al. |
| 2006/0130120 A1 | 6/2006 | Brandyberry et al. |
| 2006/0143236 A1 | 6/2006 | Wu |
| 2006/0156242 A1 | 7/2006 | Bedingfield |
| 2006/0167991 A1 | 7/2006 | Heikes et al. |
| 2006/0173910 A1 | 8/2006 | McLaughlin |
| 2006/0174277 A1 | 8/2006 | Sezan et al. |
| 2006/0190616 A1 | 8/2006 | Mayerhofer et al. |
| 2006/0195479 A1 | 8/2006 | Spiegelman et al. |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1* | 8/2006 | Rogers et al. ............... 715/727 |
| 2006/0195790 A1 | 8/2006 | Beaupre et al. |
| 2006/0200435 A1 | 9/2006 | Flinn et al. |
| 2006/0206582 A1 | 9/2006 | Finn |
| 2006/0218187 A1 | 9/2006 | Plastina et al. |
| 2006/0224757 A1 | 10/2006 | Fang et al. |
| 2006/0227673 A1 | 10/2006 | Yamashita et al. |
| 2006/0242201 A1 | 10/2006 | Cobb et al. |
| 2006/0247980 A1 | 11/2006 | Mirrashidi et al. |
| 2006/0248209 A1 | 11/2006 | Chiu et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0273155 A1 | 12/2006 | Thackston |
| 2006/0277098 A1 | 12/2006 | Chung et al. |
| 2006/0282304 A1 | 12/2006 | Bedard et al. |
| 2006/0282776 A1 | 12/2006 | Farmer et al. |
| 2006/0282856 A1 | 12/2006 | Errico et al. |
| 2006/0288041 A1 | 12/2006 | Plastina et al. |
| 2006/0288074 A1* | 12/2006 | Rosenberg ............... 709/205 |
| 2006/0293909 A1 | 12/2006 | Miyajima et al. |
| 2007/0005793 A1 | 1/2007 | Miyoshi et al. |
| 2007/0008927 A1 | 1/2007 | Herz et al. |
| 2007/0014536 A1 | 1/2007 | Hellman |
| 2007/0022437 A1 | 1/2007 | Gerken |
| 2007/0028171 A1 | 2/2007 | MacLaurin |
| 2007/0043766 A1 | 2/2007 | Nicholas et al. |
| 2007/0044010 A1 | 2/2007 | Sull et al. |
| 2007/0064626 A1 | 3/2007 | Evans |
| 2007/0078714 A1 | 4/2007 | Ott, IV et al. |
| 2007/0078832 A1 | 4/2007 | Ott, IV et al. |
| 2007/0079352 A1 | 4/2007 | Klein, Jr. |
| 2007/0083471 A1 | 4/2007 | Robbin et al. |
| 2007/0083553 A1 | 4/2007 | Minor |
| 2007/0083929 A1 | 4/2007 | Sprosts et al. |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |
| 2007/0106672 A1 | 5/2007 | Sighart et al. |
| 2007/0106693 A1 | 5/2007 | Houh et al. |
| 2007/0118425 A1 | 5/2007 | Yruski et al. |
| 2007/0118657 A1 | 5/2007 | Kreitzer et al. |
| 2007/0118802 A1 | 5/2007 | Gerace et al. |
| 2007/0118853 A1 | 5/2007 | Kreitzer et al. |
| 2007/0118873 A1 | 5/2007 | Houh et al. |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1 | 7/2007 | Thomas et al. |
| 2007/0195373 A1 | 8/2007 | Singh |
| 2007/0198485 A1 | 8/2007 | Ramer et al. |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0220081 A1 | 9/2007 | Hyman |
| 2007/0233736 A1 | 10/2007 | Xiong et al. |
| 2007/0238427 A1 | 10/2007 | Kraft et al. |
| 2007/0239724 A1 | 10/2007 | Ramer et al. |
| 2007/0244880 A1 | 10/2007 | Martin et al. |
| 2007/0245245 A1 | 10/2007 | Blue et al. |
| 2007/0264982 A1 | 11/2007 | Nguyen et al. |
| 2007/0265870 A1 | 11/2007 | Song et al. |
| 2007/0269169 A1 | 11/2007 | Stix et al. |
| 2007/0277202 A1 | 11/2007 | Lin et al. |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016205 A1 | 1/2008 | Svendsen |
| 2008/0032723 A1 | 2/2008 | Rosenberg |
| 2008/0033959 A1 | 2/2008 | Jones |
| 2008/0040313 A1 | 2/2008 | Schachter |
| 2008/0046948 A1 | 2/2008 | Verosub |
| 2008/0052371 A1 | 2/2008 | Partovi et al. |
| 2008/0052630 A1 | 2/2008 | Rosenbaum |
| 2008/0059576 A1 | 3/2008 | Liu et al. |
| 2008/0091771 A1 | 4/2008 | Allen et al. |
| 2008/0120501 A1 | 5/2008 | Jannink et al. |
| 2008/0133601 A1 | 6/2008 | Martin Cervera et al. |
| 2008/0133763 A1 | 6/2008 | Clark et al. |
| 2008/0134039 A1 | 6/2008 | Fischer et al. |
| 2008/0134043 A1 | 6/2008 | Georgis et al. |
| 2008/0134053 A1 | 6/2008 | Fischer |
| 2008/0141136 A1 | 6/2008 | Ozzie et al. |
| 2008/0147482 A1 | 6/2008 | Messing et al. |
| 2008/0147711 A1 | 6/2008 | Spiegelman et al. |
| 2008/0147876 A1 | 6/2008 | Campbell et al. |
| 2008/0160983 A1 | 7/2008 | Poplett et al. |
| 2008/0176562 A1 | 7/2008 | Howard |
| 2008/0181536 A1 | 7/2008 | Linden |
| 2008/0189336 A1 | 8/2008 | Prihodko |
| 2008/0189391 A1 | 8/2008 | Koberstein et al. |
| 2008/0189655 A1 | 8/2008 | Kol |
| 2008/0195657 A1 | 8/2008 | Naaman et al. |
| 2008/0195664 A1 | 8/2008 | Maharajh et al. |
| 2008/0208823 A1 | 8/2008 | Hicken |
| 2008/0228945 A1 | 9/2008 | Yoon et al. |
| 2008/0235632 A1 | 9/2008 | Holmes |
| 2008/0242280 A1 | 10/2008 | Shapiro et al. |
| 2008/0243733 A1* | 10/2008 | Black ............... 706/16 |
| 2008/0244681 A1 | 10/2008 | Gossweiler et al. |
| 2008/0250067 A1* | 10/2008 | Svendsen ............... 707/104.1 |
| 2008/0270561 A1 | 10/2008 | Tang et al. |
| 2008/0276279 A1 | 11/2008 | Gossweiler et al. |
| 2008/0288588 A1 | 11/2008 | Andam et al. |
| 2008/0301118 A1 | 12/2008 | Chien et al. |
| 2008/0306826 A1 | 12/2008 | Kramer et al. |
| 2008/0307462 A1 | 12/2008 | Beetcher et al. |

| | | | |
|---|---|---|---|
| 2008/0307463 | A1 | 12/2008 | Beetcher et al. |
| 2008/0313541 | A1 | 12/2008 | Shafton et al. |
| 2009/0006368 | A1 | 1/2009 | Mei et al. |
| 2009/0006374 | A1 | 1/2009 | Kim et al. |
| 2009/0007198 | A1 | 1/2009 | Lavender et al. |
| 2009/0042545 | A1 | 2/2009 | Avital et al. |
| 2009/0049045 | A1* | 2/2009 | Askey et al. ............ 707/7 |
| 2009/0055385 | A1 | 2/2009 | Jeon et al. |
| 2009/0055467 | A1 | 2/2009 | Petersen |
| 2009/0055759 | A1* | 2/2009 | Svendsen ............ 715/764 |
| 2009/0069911 | A1 | 3/2009 | Stefik |
| 2009/0069912 | A1 | 3/2009 | Stefik |
| 2009/0070350 | A1 | 3/2009 | Wang |
| 2009/0077124 | A1 | 3/2009 | Spivack et al. |
| 2009/0077220 | A1 | 3/2009 | Svendsen et al. |
| 2009/0083541 | A1 | 3/2009 | Levine |
| 2009/0089288 | A1 | 4/2009 | Petersen |
| 2009/0094248 | A1* | 4/2009 | Petersen ............ 707/10 |
| 2009/0125588 | A1* | 5/2009 | Black et al. ............ 709/204 |
| 2009/0129671 | A1 | 5/2009 | Hu et al. |
| 2009/0132527 | A1 | 5/2009 | Sheshagiri et al. |
| 2009/0164641 | A1 | 6/2009 | Rogers et al. |
| 2009/0177301 | A1 | 7/2009 | Hayes |
| 2009/0242221 | A1 | 10/2009 | Gentry et al. |
| 2010/0031366 | A1 | 2/2010 | Knight et al. |
| 2010/0198767 | A1* | 8/2010 | Farrelly ............ 706/46 |

FOREIGN PATENT DOCUMENTS

| | | |
|---|---|---|
| EP | 0898278 A2 | 2/1999 |
| EP | 1536352 A1 | 6/2005 |
| EP | 1835455 A1 | 9/2007 |
| GB | 2372850 A | 9/2002 |
| GB | 2397205 A | 7/2004 |
| JP | 2005-321668 | 11/2005 |
| WO | 01/84353 A3 | 11/2001 |
| WO | 02/21335 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/071571 A1 | 8/2005 |
| WO | 2006075032 A1 | 7/2006 |
| WO | 2006/126135 A2 | 11/2006 |
| WO | 2007092053 A1 | 8/2007 |

OTHER PUBLICATIONS

"Webjay—Playlist Community," http://www.webjay.org/, copyright 2006 Yahoo! Inc., printed Feb. 7, 2007, 5 pages.
"Wired News:," http://www.wired.com/news/digiwoo/1,57634-0.html, copyright 2005 Lycos, Inc., printed Oct. 9, 2006, 3 pages.
"Not safe for work—Wikipedia, the free encyclopedia," http://en.wikipedia.org/wiki/Work_safe, printed Nov. 8, 2007, 2 pages.
"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.
"Yahoo Music Jukebox—Wikipedia, the free encyclopedia," http://en.wikipedia.org/wiki/Yahoo_music_engine, printed Aug. 8, 2006, 1 page.
"LAUNCHcast Radio—Yahoo! Messenger," http://messenger.yahoo.com/launch.php, copyright 2007 Yahoo! Inc., printed Nov. 8, 2007, 1 page.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
"YouTube—Broadcast Yourself.," http://www.youtube.com/, copyright 2007 YouTube, LLC, printed Oct. 26, 2007, 2 pages.
"Zune.net—How-To—Share Audio Files Zune to Zune," http://web.archive.org/web/20070819121705/http://www.zune.net/en-us/support/howto/z..., copyright 2007 Microsoft Corporation, printed Nov. 14, 2007, 2 pages.
"Goombah—Preview," http://www.goombah.com/preview.html, printed Jan. 8, 2008, 5 pages.
Jeff Mascia et al., "Lifetrak: Music in Tune With Your Life," copyright 2006, 11 pages.
Jun Wang et al., "Music Recommender System for Wi-Fi Walkman," Delft University of Technology, 23 pages.

"Amazon.com: Online Shopping for Electronics, Apparel, Computers, Books, DVDs & m . . . ," http://www.amazon.com/, copyright 1996-2007 Amazon.com, Inc., printed Oct. 26, 2007, 4 pages.
"Instant Messenger—AIM—Instant Message Your Online Buddies for Free—AIM," http://dashboard.aim.com/aim, copyright 2007 AOL LLC, printed Nov. 8, 2007, 6 pages.
"Apple—iPod classic," http://www.apple.com/ipodclassic/, printed Oct. 26, 2007, 1 page.
"betterPropaganda—Free MP3s and music videos.," http://www.betterpropaganda.com/, copyright 2004-2005 betterPropaganda, printed Feb. 7, 2007, 4 pages.
"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.
"Bluetooth.com—Learn," http://www.bluetooth.com/Bluetooth/Learn/, copyright 2007 Bluetooth SIG, Inc., printed Oct. 26, 2007, 1 page.
"ChoiceStream Technology Brief, Review of Personalization Technologies: Collaborative Filtering vs. ChoiceStream's Attributized Bayesian Choice Modeling," 13 pages.
"The Classic TV Database—Your Home for Classic TV!—www.classic-tv.com," http://www.classic-tv.com, copyright The Classic TV Database—www.classic-tv.com, printed Feb. 7, 2007, 3 pages.
"Digital Tech Life >> Download of the Week," http://www.digitaltechlife.com/category/download-of-the-week/, printed Feb. 16, 2007, 9 pages.
"MP3 music download website, eMusic," http://www.emusic.com/, copyright 2007 eMusic.com Inc., printed Feb. 7, 2007, 1 page.
"GenieLab::Music Recommendation System," http://web.archive.org/web/20060813000442/http://genielab.com/, copyright 2005 GenieLab, LLC, printed Oct. 26, 2007, 1 page.
"The Daily Barometer—GenieLab.com grants music lovers' wishes," http://media.barometer.orst.edu/home/index.cfm?event=displayArticlePrinterFriendly&uSt..., copyright 2007 The Daily Barometer, printed Feb. 16, 2007, 2 pages.
"Gracenote Playlist," Revised Dec. 29, 2005, 2 pages.
"Gracenote Playlist Plus," Revised Dec. 29, 2005, 2 pages.
"Gracenote," http://www.gracenote.com, printed Feb. 7, 2007, 1 page.
"IEEE 802.11—Wikipedia, the free encyclopedia," http://en.wikipedia.org/wiki/IEEE_802.11, printed Oct. 26, 2007, 5 pages.
"iLikeTM—Home," http://www.ilike.com/, copyright 2007 iLike, printed May 17, 2007, 2 pages.
"The Internet Movie Database (IMDb)," http://www.imdb.com/, copyright 1990-2007 Internet Movie Database Inc., printed Feb. 7, 2007, 3 pages.
"Apple—iPod + iTunes," http://www.apple.com/itunes/, copyright 2007 Paramount Pictures, printed Feb. 7, 2007, 2 pages.
"last.fm the social music revolution," 1 page.
"Last.fm—Wikipedia, the free encyclopedia," http://en.wikipedia.org/wiki/Last.fm, printed Aug. 8, 2006, 7 pages.
"LimeWire—Wikipedia, the free encyclopedia," http://en.wikipedia.org/wiki/LimeWire, printed Aug. 8, 2006, 2 pages.
"liveplasma music, movies, search engine and discovery engine," http://www.liveplasma.com, printed May 17, 2007, 1 page.
"Loomia—Personalized Recommendations for Media, Content and Retail Sites," http://www.loomia.com/, copyright 2006-2007 Loomia Inc., printed Feb. 7, 2007, 2 pages.
"Mercora—Music Search and Internet Radio Network," http://www.mercora.com/overview.asp, copyright 2004-2006 Mercora, Inc., printed Aug. 8, 2006, 1 page.
"Mercora—Music Search and Internet Radio Network," http://www.mercora.com/v6/_front/web.jsp, printed Feb. 7, 2007, 1 page.
"Outlook Home Page—Microsoft Office Online," http://office.microsoft.com/en-us/outlook/default.aspx, copyright 2007 Microsoft Corporation, printed Nov. 8, 2007, 1 page.
"Welcome to the MUSICMATCH Guide," http://www.mmguide.musicmatch.com/, copyright 2001-2004 Musicmatch, Inc., printed Feb. 7, 2007, 1 page.
"Mongomusic.com—The Best Download mp3 Resources and Information. This website is for sale!," http://www.mongomusic.com/, printed May 17, 2007, 2 pages.

"Thunderbird—Reclaim your inbox," http://www.mozilla.com/en-US/thunderbird/, copyright 2005-2007 Mozilla, printed Nov. 8, 2007, 2 pages.
"Take a look at the Future of Mobile Music :: MUSIC GURU," http://www.symbian-freak.com/news/006/02/music_guru.htm, copyright 2005 Symbian freak, printed Feb. 7, 2007, 3 pages.
"Music Recommendations 1.0—MacUpdate," http://www.macupdate.com/info.php/id/19575, printed Feb. 16, 2007, 1 page.
"MusicGremlin," http://www.musicgremlin.com/StaticContent.aspx?id=3, copyright 2005, 2006, 2007 MusicGremlin, Inc., printed Oct. 26, 2007, 1 page.
"MusicIP—The Music Search Engine," http://www.musicip.com/, copyright 2006-2007 MusicIP Corporation, printed Feb. 7, 2007, 1 page.
"Digital Music News," http://www.digitalmusicnews.com/results?title=musicstrands, copyright 2003-6 Digital Music News, printed Aug. 8, 2006, 5 pages.
"Musicstrands.com Because Music is Social," copyright 2006 MusicStrands, Inc., 2 pages.
"MyStrands for Windows 0.7.3 Beta," copyright 2002-2006 ShareApple.com networks, printed Jul. 16, 2007, 3 pages.
"MyStrands for Windows Change Log," http://www.mystrands.com/mystrands/windows/changelog.vm, printed Jul. 16, 2007, 6 pages.
"MyStrands Download," http://www.mystrands.com/overview.vm, printed Feb. 7, 2007, 3 pages.
"Napster—All the Music You Want," http://www.napster.com/using_napster/all_the_music_you_want.html, copyright 2003-2006 Napster, LLC, printed Feb. 7, 2007, 2 pages.
"Try Napster free for 7 Days—Play and download music without paying per song.," http://www.napster.com/choose/index.html, copyright 2003-2007 Napster, LLC, printed Feb. 7, 2007, 1 page.
"FAQ," http://blog.pandora.com/faq/, copyright 2005-2006 Pandora Media, Inc., printed Aug. 8, 2006, 20 pages.
"Pandora Internet Radio—Find New Music, Listen to Free Web Radio," http://www.pandora.com/, copyright 2005-2007 Pandora Media, Inc., printed Feb. 7, 2007, 1 page.
"Pandora Radio—Listen to Free Internet Radio, Find New Music," http://www.pandora.com/mgp, copyright 2005-2007 Pandora Media, Inc., printed Oct. 26, 2007, 1 page.
"RYM FAQ—Rate Your Music," http://rateyourmusic.com/faq/, copyright 2000-2007 rateyourmusic.com, printed Nov. 8, 2007, 14 pages.
"Rhapsody—Full-length music, videos and more—FREE," http://www.rhapsody.com/welcome.html, copyright 2001-2007 Listen.com, printed Feb. 7, 2007, 1 page.
Badrul M. Sarwar et al., "Recommender Systems for Large-scale E-Commerce: Scalable Neighborhood Formation Using Clustering," 2002, 6 pages.
"Soundflavor," http://www.soundflavor.com/, copyright 2003-2007 Soundflavor, Inc., printed Feb. 7, 2007, 1 page.
"that canadian girl >> Blog Archive >> GenieLab," http://www.thatcanadiangirl.co.uk/blog/2005/02/22/genielab/, copyright 2007 Vero Pepperrell, printed Feb. 16, 2007, 3 pages.
"Trillian (software)—Wikipedia, the free encyclopedia," http://en.wikipedia.org/wiki/Trillian_(instant_messenger), printed Nov. 8, 2007, 11 pages.

"Babulous :: Keep it loud," http://www.babulous.com/home.jhtml, copyright 2009 Babulous, Inc., printed Mar. 26, 2009, 2 pages.
Jennifer Golbeck, "Trust and Nuanced Profile Similarity in Online Social Networks," available from http://www.cs.umd.edu/~golbeck/publications.shtml, 2008, 30 pages.
"MixxMaker: The Mix Tape Goes Online—AppScout," http://www.appscout.com/2008/01/mixxmaker_the_mixtape_goes_onl_1.php, copyright 1996-2009 Ziff Davis Publishing Holdings Inc., printed Aug. 3, 2009, 3 pages.
"Tours Profile," http://mog.com/Tour, copyright 2006-2009 Mog Inc., printed Aug. 3, 2009, 11 pages.
"Ringo: Social Information Filtering for Music Recommendation," http://jolomo.net/ringo.html, printed Aug. 3, 2009, 1 page.
"About uPlayMe," copyright 2008 uPlayMe, Inc., 4 pages.
"Collect everything you listen to and watch in one place, and effortlessly share them with your friends.," copyright 2008 uPlayMe, Inc., 1 page.
Barrie-Anthony, Steven, "That song sounds familiar," Los Angeles Times, Feb. 3, 2006, available from http://www.calendarlive.com/printedition/calendar/cl-et-pandora3feb03,0,7458778.story?track=tottext,0,19432.story?track=tothtml, 5 pages.
Cai, Rui et al., "Scalable Music Recommendation by Search," Proc. ACM Multimedia, Augsburg, Germany, Sep. 2007, pp. 1065-1074.
Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.
Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.
Yahoo! Music downloaded archival page from www.archive.org for Jun. 20, 2005, copyright 2005 Yahoo! Inc., 14 pages.
"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.
"Identifying iPod models," http://support.apple.com/kb/HT1353, printed Feb. 24, 2010, 13 pages.
Mitchell, Bradley, "Cable Speed—How Fast is Cable Modem Internet?," http://www.compnetworking.about.com/od/internetaccessbestuses/f/cablespeed.htm, printed Feb. 24, 2010, 2 pages.
"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.
"Hulu—About," www.hulu.com/about/product_tour, copyright 2010 Hulu LLC, printed Jun. 15, 2010, 2 pages.
Nilson, Martin, "id3v2.4.0-frames - ID3.org," http://www.id3.org/id3v2.4.0-frames, Nov. 1, 2000, copyright 1998-2009, printed Jun. 15, 2010, 31 pages.
"Songbird," http://getsongbird.com/, copyright 2010 Songbird, printed Jun. 15, 2010, 2 pages.
"SongReference," http://songreference.com/, copyright 2008, SongReference.com, printed Jun. 15, 2010, 1 page.

* cited by examiner

USER: HUGH

CURRENT SONG
CURRENT ALBUM

— 142

| user | song | artist | genre | decade | time | availability | score |
|---|---|---|---|---|---|---|---|
| hugh | sweet emotion | aerosmith | rock | 1970s | 45:32:21 | local | 95 |
| waymen | so what | miles davis | jazz | 1960s | 6:37 | find | 94 |
| gary | dance in my sleep | dave adams | alternative | 1980s | 4:25 | subscription network | 92 |
| waymen | come away with me | norah jones | jazz | 2000s | 4:56 | subscription network | 88 |
| mike | walk the line | johnny cash | country | 1970s | 5:31 | buy/download | 86 |
| hugh | say hey | the tubes | alternative | 1980s | 20:54:24 | local | 86 |
| hugh | you get what you give | new radicals | alternative | 1990s | 4:12:03 | local | 83 |
| hugh | tenderness | general public | new wave | 1980s | 25:32:21 | local | 83 |
| hugh | running with the devil | van halen | rock | 1970s | 12:35:11 | local | 82 |
| gene | rebel yell | billy idol | punk | 1980s | 0:32 | subscription network | 81 |
| gene | beautiful day | u2 | rock | 2000s | 7:54 | local | 79 |
| mike | still lovin you | scorpions | metal | 1980s | 1:03 | subscription network | 76 |
| gene | true | spandau ballet | dance | 1980s | 3:31 | subscription network | 72 |
| gary | heart of the night | poco | rock | 1970s | 0:42 | subscription network | 67 |
| gary | roundabout | yes | rock | 1970s | 6:11 | buy/download | 67 |
| gene | alison | elvis costello | alternative | 1980s | 5:51 | buy/download | 65 |
| gary | run to the hills | iron maiden | metal | 1970s | 7:21 | local | 64 |
| mike | hound dog | elvis presley | rock | 1980s | 6:19 | buy/download | 55 |
| waymen | something more | sugarland | country | 2000s | 0:37 | subscription network | 25 |

*FIG. 13*

CURRENT SONG
CURRENT ALBUM

USER: HUGH

— 142

| user | song | artist 180 | genre | decade | time | availability | score |
|---|---|---|---|---|---|---|---|
| gary | dance in my sleep | dave adams | alternative | 1980s | 4:25 | subscription network | 92 |
| hugh | say hey | the tubes | alternative | 1980s | 20:54:24 | local | 86 |
| hugh | you get what you give | new radicals | alternative | 1990s | 4:12:03 | local | 83 |
| gene | alison | elvis costello | alternative | 1980s | 5:51 | buy/download | 65 |
| hugh | sweet emotion | aerosmith | rock | 1970s | 45:32:21 | local | 95 |
| hugh | running with the devil | van halen | rock | 1970s | 12:35:11 | local | 82 |
| gene | beautiful day | u2 | rock | 2000s | 7:54 | local | 79 |
| gary | heart of the night | poco | rock | 1970s | 0:42 | subscription network | 67 |
| gary | roundabout | yes | rock | 1970s | 6:11 | buy/download | 67 |
| mike | hound dog | elvis presley | rock | 1980s | 6:19 | buy/download | 55 |
| mike | still lovin you | scorpions | metal | 1980s | 1:03 | subscription network | 76 |
| gary | run to the hills | iron maiden | metal | 1970s | 7:21 | local | 64 |
| waymen | so what | miles davis | jazz | 1960s | 6:37 | find | 94 |
| waymen | come away with me | norah jones | jazz | 2000s | 4:56 | subscription network | 88 |
| gene | rebel yell | billy idol | punk | 1980s | 0:32 | subscription network | 81 |
| hugh | tenderness | general public | new wave | 1980s | 5:31 | local | 83 |
| gene | true | spandau ballet | dance | 1980s | 25:32:21 | subscription network | 72 |
| mike | walk the line | johnny cash | country | 1970s | 3:31 | buy/download | 86 |
| waymen | something more | sugarland | country | 2000s | 0:37 | subscription network | 25 |

FIG. 14

P2P REAL TIME MEDIA RECOMMENDATIONS

RELATED APPLICATION

The present application is a Continuation-In-Part (CIP) of U.S. patent application Ser. No. 11/484,130, entitled P2P NETWORK FOR REAL TIME MEDIA RECOMMENDATIONS, which was filed on Jul. 11, 2006 and is hereby incorporated herein by reference in its entirety.

FIELD OF THE INVENTION

The present invention relates to media recommendations, such as music or video recommendations, and more specifically relates to peer-to-peer (P2P) real time media recommendations.

BACKGROUND OF THE INVENTION

In recent years, there has been an enormous increase in the amount of digital media, such as music, available online. Services, such as Apple's iTunes Music Store® service, enable users to legally purchase and download music. Other services such as Yahoo!® Music Unlimited and RealNetwork's Rhapsody provide access to millions of songs for a monthly subscription fee. As a result, music has become much more accessible to listeners worldwide. However, the increased accessibility of music has only heightened a long-standing problem for the music industry, which is namely the issue of linking audiophiles with new music that matches their listening preferences.

Many companies, technologies, and approaches have emerged to address this issue of music recommendation. Some companies have taken an analytical approach. They review various attributes of a song, such as melody, harmony, lyrics, orchestration, vocal character, and the like, and assign a rating to each attribute. The ratings for each attribute are then assembled to create a holistic classification for the song that is then used by a recommendation engine. The recommendation engine typically requires that the user first identify a song that he or she likes. The recommendation engine then suggests other songs with similar attributions. Companies using this type of approach include Pandora, SoundFlavor, MusicIP, and MongoMusic (purchased by Microsoft in 2000).

Other companies take a communal approach. They make recommendations based on the collective wisdom of a group of users with similar musical tastes. These solutions first profile the listening habits of a particular user and then search similar profiles of other users to determine recommendations. Profiles are generally created in a variety of ways such as looking at a user's complete collection, the playcounts of their songs, their favorite playlists, and the like. Companies using this technology include Last.fm, Music Strands, WebJay, Mercora, betterPropaganda, Loomia, eMusic, musicmatch, genielab, upto11, Napster, and iTunes with its celebrity playlists.

The problem with these traditional recommendation systems is that they fail to consider peer influences. For example, the music that a particular teenager listens to may be highly influenced by the music listened to by a group of the teenager's peers, such as his or her friends. As such, there is a need for a music recommendation system and method that recommends music to a user based on the listening habits of a peer group.

SUMMARY OF THE INVENTION

The present invention relates to systems and methods for providing peer-to-peer (P2P) media recommendations in real-time, or substantially real-time. The media recommendations may be, for example, song recommendations or video recommendations. In one embodiment, a central streaming media service operates to stream media presentations to user devices of users registered with the central streaming media service. For each user desiring to send and receive media recommendations, each time a media presentation is streamed to and played by a user device of the user, the central streaming media service provides a media recommendation identifying the media presentation to one or more other users associated with the user. In addition, while the media presentation is being streamed to and played by the user device of the user, the central streaming media service provides media recommendations to the user from one or more other users in response to corresponding media presentations being streamed to and played by the one or more other users. Once streaming and playback of the media presentation is complete or substantially complete, the central streaming media service automatically selects a next media presentation to be streamed to and played by the user device of the user from a group of media presentations including the media presentations identified by the media recommendations provided to the user. Once the next media presentation is selected, the central streaming media service begins streaming the selected media presentation to the user device of the user.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 13 illustrates an exemplary GUI displaying a playlist including both songs from a local music collection of a peer device and recommended songs from other peer devices, where the songs are sorted by a score determined based on user preferences according to one embodiment of the present invention;

FIG. 14 illustrates an exemplary GUI displaying a playlist including both songs from a local music collection of a peer device and recommended songs from other peer devices, where the songs are sorted by a both genre and score according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
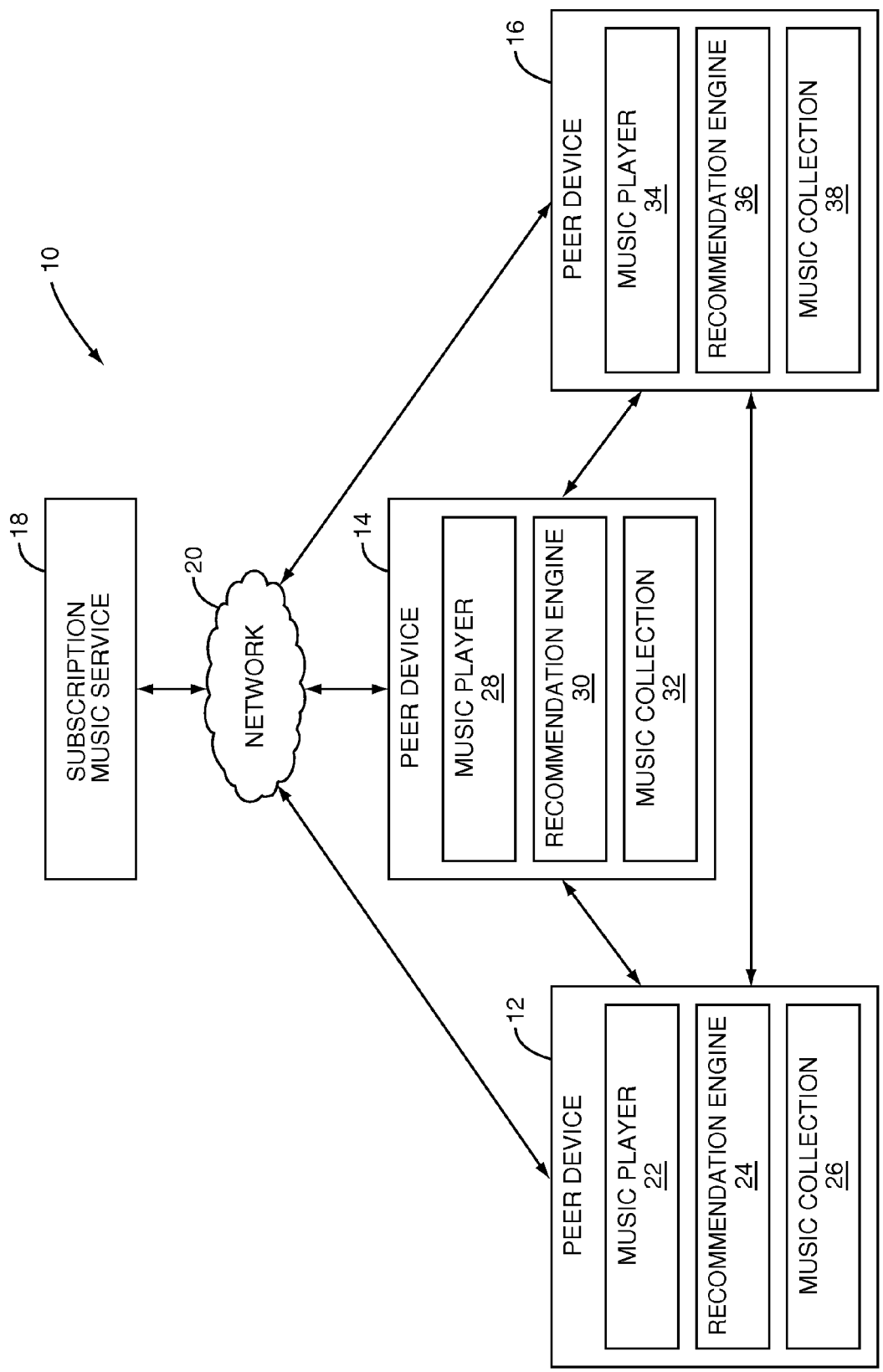
FIG. 1 illustrates a system incorporating a peer-to-peer (P2P) network for real time media recommendations according to one embodiment of the present invention.

FIG. 1 illustrates a system 10 incorporating a P2P network for providing real time song recommendations according to one embodiment of the present invention. Note that while the discussion herein focuses on song recommendations for clarity and ease of discussion, the present invention is equally applicable to providing recommendations for other types of media presentations such as video presentations, as will be apparent to one of ordinary skill in the art upon reading this disclosure. Exemplary video presentations are movies, television programs, and the like. In general, the system 10 includes a number of peer devices 12-16 which are optionally connected to a subscription music service 18 via a network 20, which may be a distributed public network such as, but not limited to, the Internet. Note that while three peer devices 12-16 are illustrated, the present invention may be used with any number of two or more peer devices.

In this embodiment, the peer devices 12-16 are preferably portable devices such as, but not limited to, portable audio players, mobile telephones, Personal Digital Assistants (PDAs), or the like having audio playback capabilities. However, the peer devices 12-16 may alternatively be stationary devices such as a personal computer or the like. The peer devices 12-16 include local wireless communication interfaces (FIG. 15) communicatively coupling the peer devices 12-16 to form a peer-to-peer (P2P) network. The wireless communication interfaces may provide wireless communication according to, for example, one of the suite of IEEE 802.11 standards, the Bluetooth standard, or the like.

The peer device 12 includes a music player 22, a recommendation engine 24, and a music collection 26. The music player 22 may be implemented in software, hardware, or a combination of hardware and software. In general, the music player 22 operates to play songs from the music collection 26. The recommendation engine 24 may be implemented in software, hardware, or a combination of hardware and software. The recommendation engine 24 may alternatively be incorporated into the music player 22. The music collection 26 includes any number of song files stored in one or more digital storage units such as, for example, one or more hard-disc drives, one or more memory cards, internal Random-Access Memory (RAM), one or more associated external digital storage devices, or the like.

In operation, each time a song is played by the music player 22, the recommendation engine 24 operates to provide a recommendation identifying the song to the other peer devices 14, 16 via the P2P network. The recommendation does not include the song. In one embodiment, the recommendation may be a recommendation file including information identifying the song. In addition, as discussed below in detail, the recommendation engine 24 operates to programmatically, or automatically, select a next song to be played by the music player 22 based on the recommendations received from the other peer device 14, 16 identifying songs recently played by the other peer devices 14, 16 and user preferences associated with the user of the peer device 12.

Like the peer device 12, the peer device 14 includes a music player 28, a recommendation engine 30, and a music collection 32, and the peer device 16 includes a music player 34, a recommendation engine 36, and a music collection 38.

The subscription music service 18 may be a service hosted by a server connected to the network 20. Exemplary subscription based music services that may be modified to operate according to the present invention are Yahoo! Music Unlimited digital music service and RealNetwork's Rhapsody digital music service.

Figure 2:
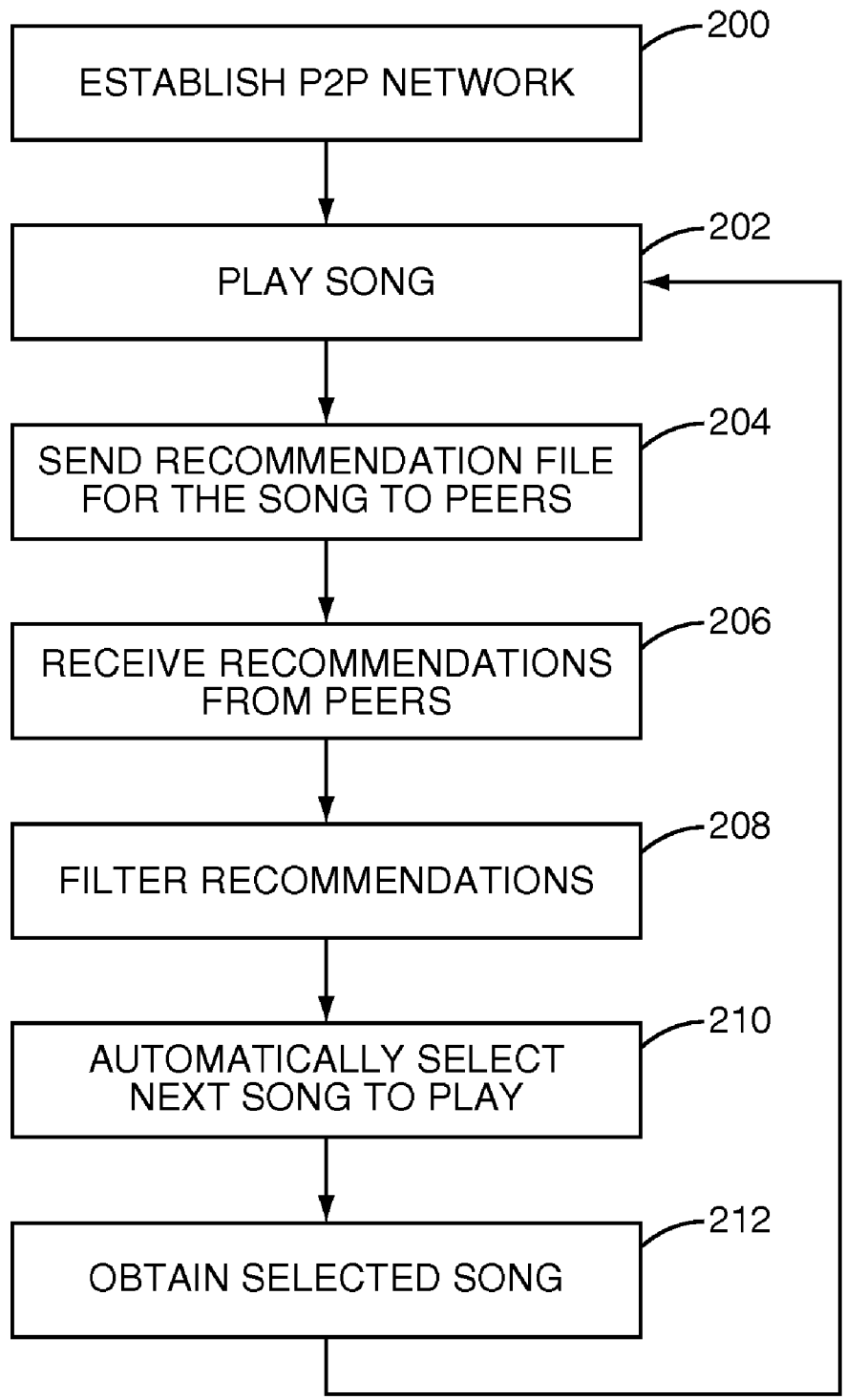
FIG. 2 is a flow chart illustrating the operation of the peer devices of FIG. 1 according to one embodiment of the present invention.

FIG. 2 illustrates the operation of the peer device 12 according to one embodiment of the present invention. However, the following discussion is equally applicable to the other peer devices 14, 16. First, the peer devices 12-16 cooperate to establish a P2P network (step 200). The P2P network may be initiated using, for example, an electronic or verbal invitation. Invitations may be desirable when the user wishes to establish the P2P network with a particular group of other users, such as his or her friends. Note that this may be beneficial when the user desires that the music he or she listens to be influenced only by the songs listened to by, for example, the user's friends. Invitations may also be desirable when the number of peer devices within a local wireless coverage area of the peer device 12 is large. As another example, the peer device 12 may maintain a "buddy list" identifying friends of the user of the peer device 12, where the peer device 12 may automatically establish a P2P network with the peer devices of the users identified by the "buddy list" when the peer devices are within a local wireless coverage area of the peer device 12.

Alternatively, the peer device 12 may establish an ad-hoc P2P network with the other peer devices 14, 16 by detecting the other peer devices 14, 16 within the local wireless coverage area of the peer device 12 and automatically establishing the P2P network with at least a subset of the detected peer devices 14, 16. In order to control the number of peer devices within the ad-hoc P2P network, the peer device 12 may compare user profiles of the users of the other peer devices 14, 16 with a user profile of the user of the peer device 12 and determine whether to permit the other peer devices 14, 16 to enter the P2P network based on the similarities of the user profiles.

At some point after the P2P network is established, the peer device 12 plays a song (step 202). Initially, before any recommendations have been received from the other peer devices 14, 16, the song may be a song from the music collection 26 selected by the user of the peer device 12. Prior to, during, or after playback of the song, the recommendation engine 24 sends a recommendation identifying the song to the other peer devices 14, 16 (step 204). The recommendation may include, but is not limited to, information identifying the song such as a Globally Unique Identifier (GUID) for the song, title of the song, or the like; a Uniform Resource Locator (URL) enabling other peer devices to obtain the song such as a URL enabling download or streaming of the song from the subscription music service 18 or a URL enabling purchase and download of the song from an e-commerce service; a URL enabling download or streaming of a preview of the song from the subscription music service 18 or a similar e-commerce service; metadata describing the song such as ID3 tags including, for example, genre, the title of the song, the artist of the song, the album on which the song can be found, the date of release of the song or album, the lyrics, and the like.

The recommendation may also include a list of recommenders including information identifying each user having previously recommended the song and a timestamp for each recommendation. For example, if the song was originally played at the peer device 14 and then played at the peer device 16 in response to a recommendation from the peer device 14, the list of recommenders may include information identifying the user of the peer device 14 or the peer device 14 and a timestamp identifying a time at which the song was played or recommended by the peer device 14, and information identifying the user of the peer device 16 or the peer device 16 and a timestamp identifying a time at which the song was played or recommended by the peer device 16. Likewise, if the peer device 12 then selects the song for playback, information identifying the user of the peer device 12 or the peer device 12 and a corresponding timestamp may be appended to the list of recommenders.

The peer device 12, and more specifically the recommendation engine 24, also receives recommendations from the other peer devices 14, 16 (step 206). The recommendations from the other peer devices 14, 16 identify songs played by the other peer devices 14, 16. Optionally, the recommendation engine 24 may filter the recommendations from the other peer devices 14, 16 based on, for example, user, genre, artist, title, album, lyrics, date of release, or the like (step 208).

The recommendation engine 24 then automatically selects a next song to play from the songs identified by the recommendations received from the other peer devices 14, 16, optionally songs identified by previously received recommendations, and one or more songs from the music collection 26 based on user preferences (step 210). In one embodiment, the recommendation engine 24 considers only those songs identified by recommendations received since a previous song selection. For example, if the song played in step 202 was a song selected by the recommendation engine 24 based on prior recommendations from the peer devices 14, 16, the recommendation engine 24 may only consider the songs identified in new recommendations received after the song was selected for playback in step 202 and may not consider the songs identified in the prior recommendations. This may be beneficial if the complexity of the recommendation engine 24 is desired to be minimal such as when the peer device 12 is a mobile terminal or the like having limited processing and memory capabilities. In another embodiment, the recommendation engine 24 may consider all previously received recommendations, where the recommendations may expire after a predetermined or user defined period of time.

As discussed below, the user preferences used to select the next song to play may include a weight or priority assigned to each of a number of categories such as user, genre, decade of release, and availability. Generally, availability identifies whether songs are stored locally in the music collection 26; available via the subscription music service 18; available for download, and optionally purchase, from an e-commerce service or one of the other peer devices 14, 16; or are not currently available where the user may search for the songs if desired. The user preferences may be stored locally at the peer device 12 or obtained from a central server via the network 20. If the peer device 12 is a portable device, the user preferences may be configured on an associated user system, such as a personal computer, and transferred to the peer device 12 during a synchronization process. The user preferences may alternatively be automatically provided or suggested by the recommendation engine 24 based on a play history of the peer device 12. In the preferred embodiment discussed below, the songs identified by the recommendations from the other peer devices 14, 16 and the songs from the music collection 26 are scored or ranked based on the user preferences. Then, based on the scores, the recommendation engine 24 selects the next song to play.

Once the next song to play is selected, the peer device 12 obtains the selected song (step 212). If the selected song is part of the music collection 26, the peer device 12 obtains the selected song from the music collection 26. If the selected song is not part of the music collection 26, the recommendation engine 24 obtains the selected song from the subscription music service 18, an e-commerce service, or one of the other peer devices 14, 16. For example, the recommendation for the song may include a URL providing a link to a source from which the song may be obtained, and the peer device 12 may obtain the selected song from the source identified in the recommendation for the song. Once obtained, the selected song is played and the process repeats (steps 202-212).

Figure 3:
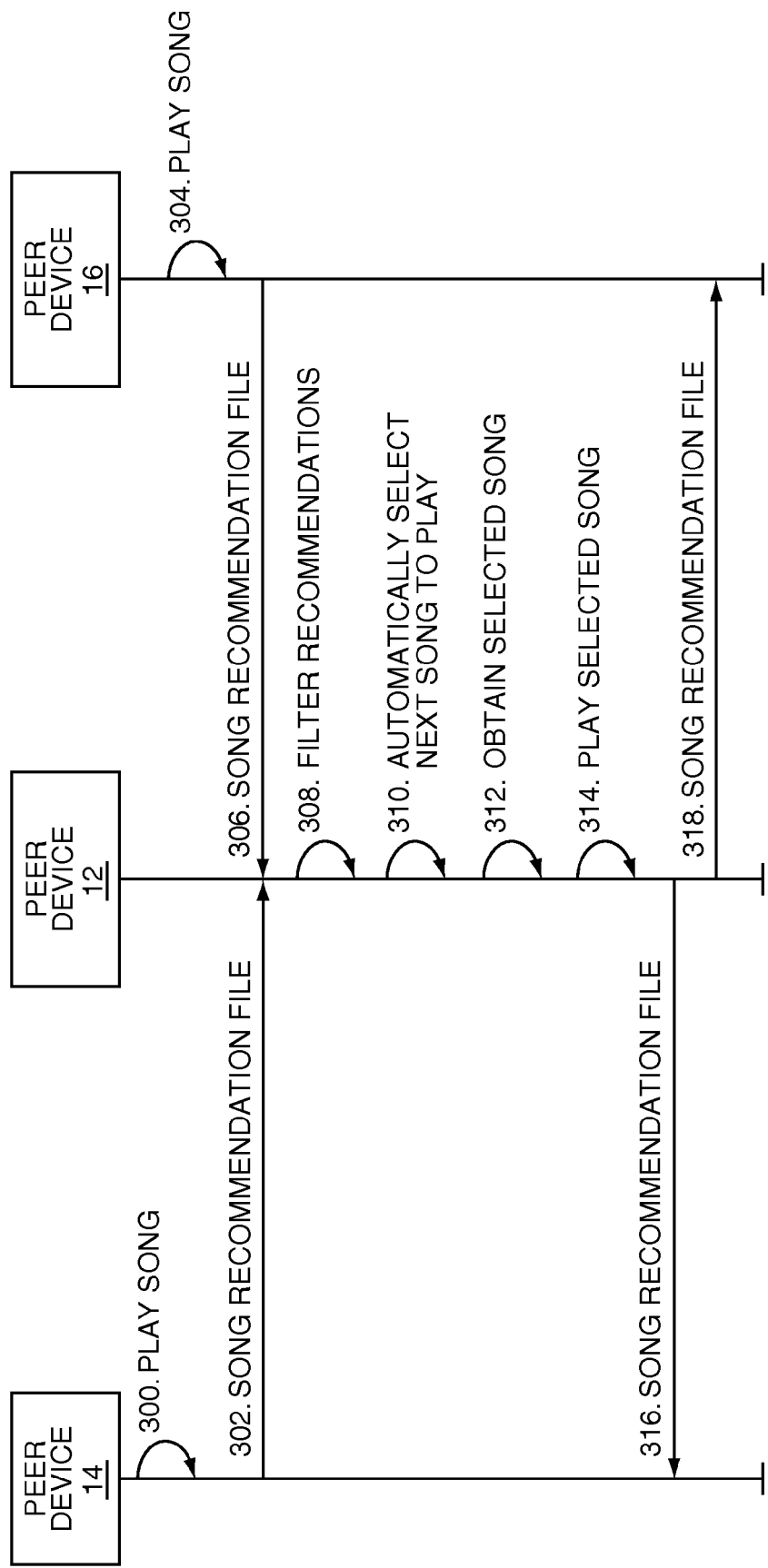
FIG. 3 illustrates the operation of the system of FIG. 1 according to one embodiment of the present invention.

FIG. 3 illustrates the operation of the peer devices 12-16 to provide real time song recommendations according to one embodiment of the present invention. The illustrated process is the same as discussed above with respect to FIG. 2. As such, the details will not be repeated. In general, the peer devices 14, 16 play songs and, in response, provide song recommendations to the peer device 12 (steps 300-306). The peer device 12 may optionally filter the recommendations from the peer devices 14, 16 (step 308). The recommendation engine 24 of the peer device 12 then automatically selects the next song to play from the songs identified by the recommendations, optionally songs identified by prior recommendations from the peer devices 14, 16, and locally stored songs from the music collection 26 based on user preferences of the user of the peer device 12 (step 310). The peer device 12 then obtains and plays the selected song (steps 312-314). Either prior to, during, or after playback of the selected song, the recommendation engine 24 of the peer device 12 provides a recommendation identifying the selected song to the other peer devices 14, 16 (step 316-318).

Figure 4:
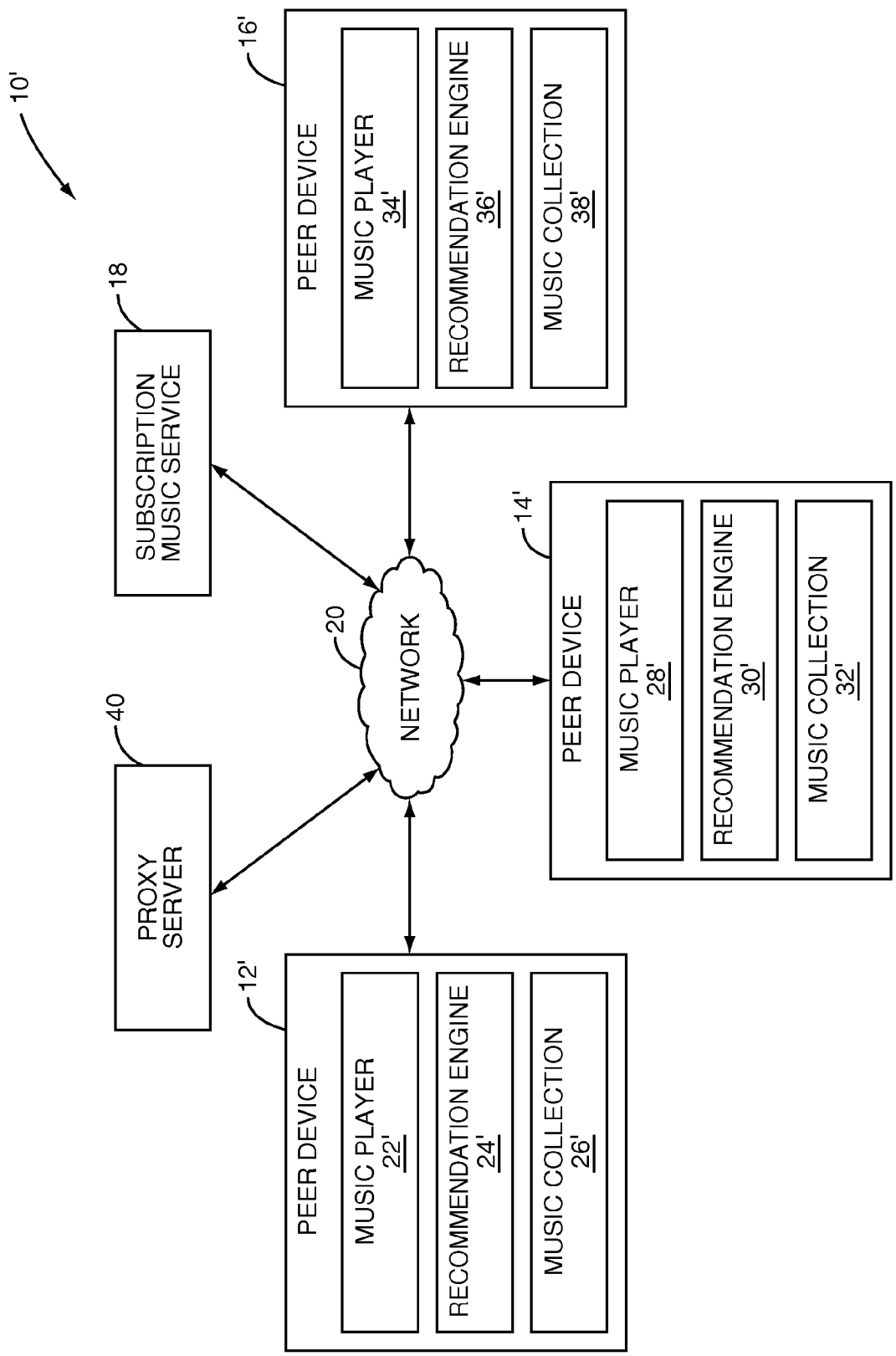
FIG. 4 illustrates a system incorporating a P2P network for real time media recommendations according to a second embodiment of the present invention.

FIG. 4 illustrates the system 10' according to second embodiment of the present invention. In this embodiment, the peer devices 12'-16' form a P2P network via the network 20 and a proxy server 40. The peer devices 12'-16' may be any device having a connection to the network 20 and audio playback capabilities. For example, the peer devices 12'-16' may be personal computers, laptop computers, mobile telephones, portable audio players, PDAs, or the like having either a wired or wireless connection to the network 20. As discussed above with respect to the peer device 12, the peer device 12' includes music player 22', a recommendation engine 24', and a music collection 26'. Likewise, the peer device 14' includes a music player 28', a recommendation engine 30', and a music collection 32', and the peer device 16' includes a music player 34', a recommendation engine 36', and a music collection 38.

Figure 5:
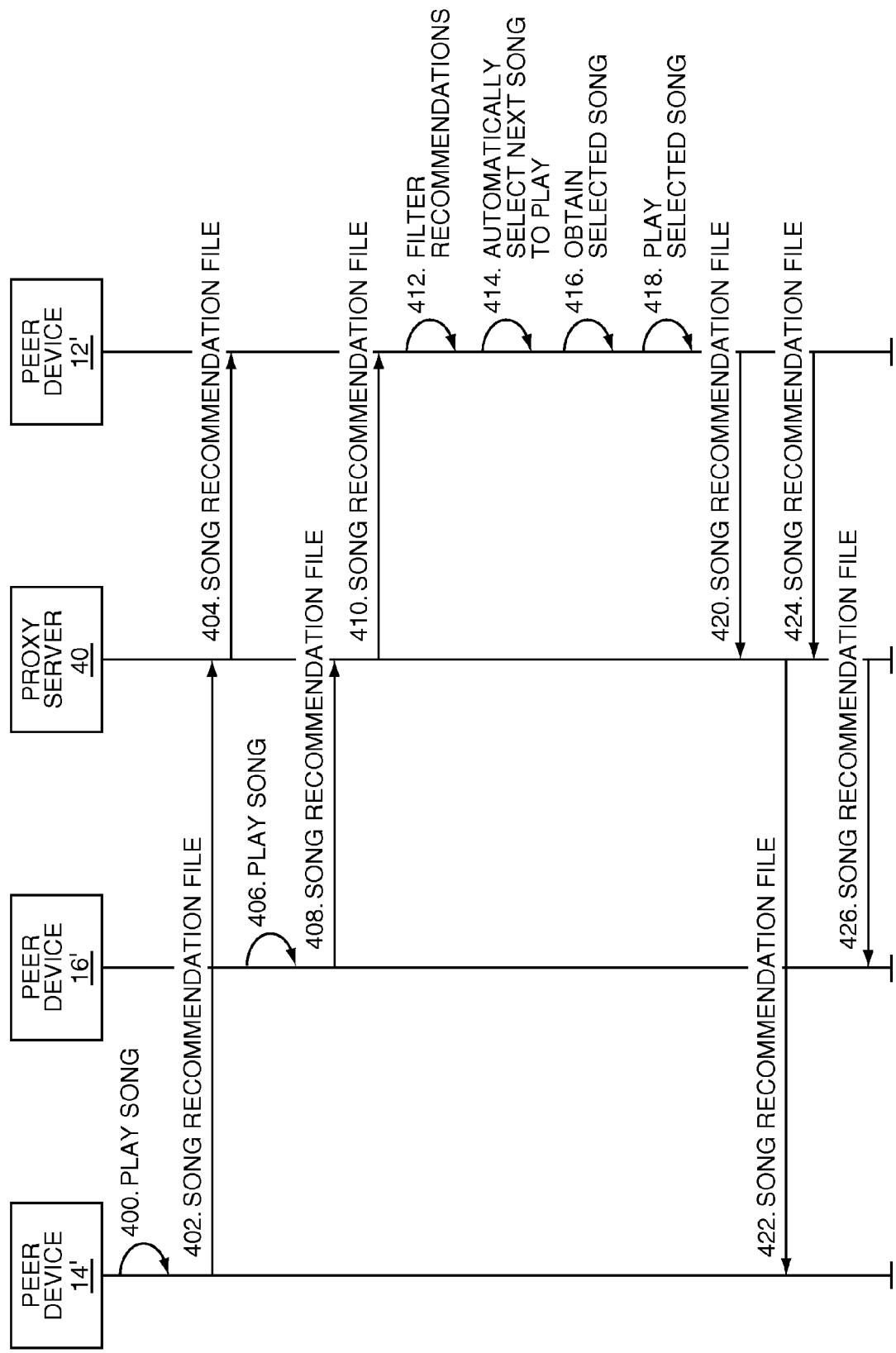
FIG. 5 illustrates the operation of the system of FIG. 4 according to one embodiment of the present invention.

FIG. 5 illustrates the operation of the system 10' of FIG. 4. Prior to beginning the process, the peer devices 12'-16' form a P2P network. Since the number of peer devices 12'-16' that may be connected to the network 20 may be very large, the peer devices 12'-16' may implement some technique for identifying a desired group of peer devices for the P2P network. For example, the P2P network may be initiated using, for example, an electronic or verbal invitation. As another example, the peer device 12' may maintain a "buddy list" identifying friends of the user of the peer device 12', where the peer device 12' may automatically establish a P2P network with the peer devices of the users identified by the "buddy list" when the peer devices are connected to the network 20. Alternatively, the peer devices 12'-16' may form an ad-hoc network where the participants for the ad-hoc network are selected based on similarities in user profiles.

In this example, once the P2P network is established, the peer device 14' plays a song and, in response, provides a song recommendation identifying the song to the peer device 12' via the proxy server 40 (steps 400-404). While not illustrated for clarity, the peer device 14' also sends the recommendation for the song to the peer device 16' via the proxy server 40. The peer device 16' also plays a song and sends a song recommendation to the peer device 12' via the proxy server 40 (steps 406-410). Again, while not illustrated for clarity, the peer device 16' also sends the recommendation for the song to the peer device 14' via the proxy server 40.

From this point, the process continues as discussed above. More specifically, the recommendation engine 24' may optionally filter the recommendations from the other peer devices 14', 16' based on, for example, user, genre, artist, title, album, lyrics, date of release, or the like (step 412). The recommendation engine 24' then automatically selects a next song to play from the songs identified by the recommendations received from the other peer devices 14'-16', optionally songs identified by previously received recommendations from the peer devices 14'-16', and one or more songs from the music collection 26' based on user preferences (step 414). In the preferred embodiment discussed below, the songs identified by the recommendations from the other peer devices 14'-16' and the songs from the music collection 26' are scored based on the user preferences. Then, based on the scores, the recommendation engine 24' selects the next song to play.

Once the next song to play is selected, the peer device 12' obtains the selected song (step 416). If the selected song is part of the music collection 26', the peer device 12' obtains the selected song from the music collection 26'. If the selected song is not part of the music collection 26', the recommendation engine 24' obtains the selected song from the subscription music service 18, an e-commerce service, or one of the other peer devices 14'-16'. For example, the selected song may be obtained from a source identified in the recommendation for the song. Once obtained, the selected song is played and a recommendation for the song is provided to the other peer devices 14'-16' via the proxy server 40 (steps 418-426). Note that while FIG. 5 illustrates two separate song recommendation files sent from the peer device 12' to the proxy server 40, the present invention is not limited thereto. One of ordinary skill in the art will appreciate that a single song recommendation file may be provided from the peer device 12' to the proxy server 40. The proxy server 40 may then forward the song recommendation file to the peer devices 14' and 16'.

Figure 6:
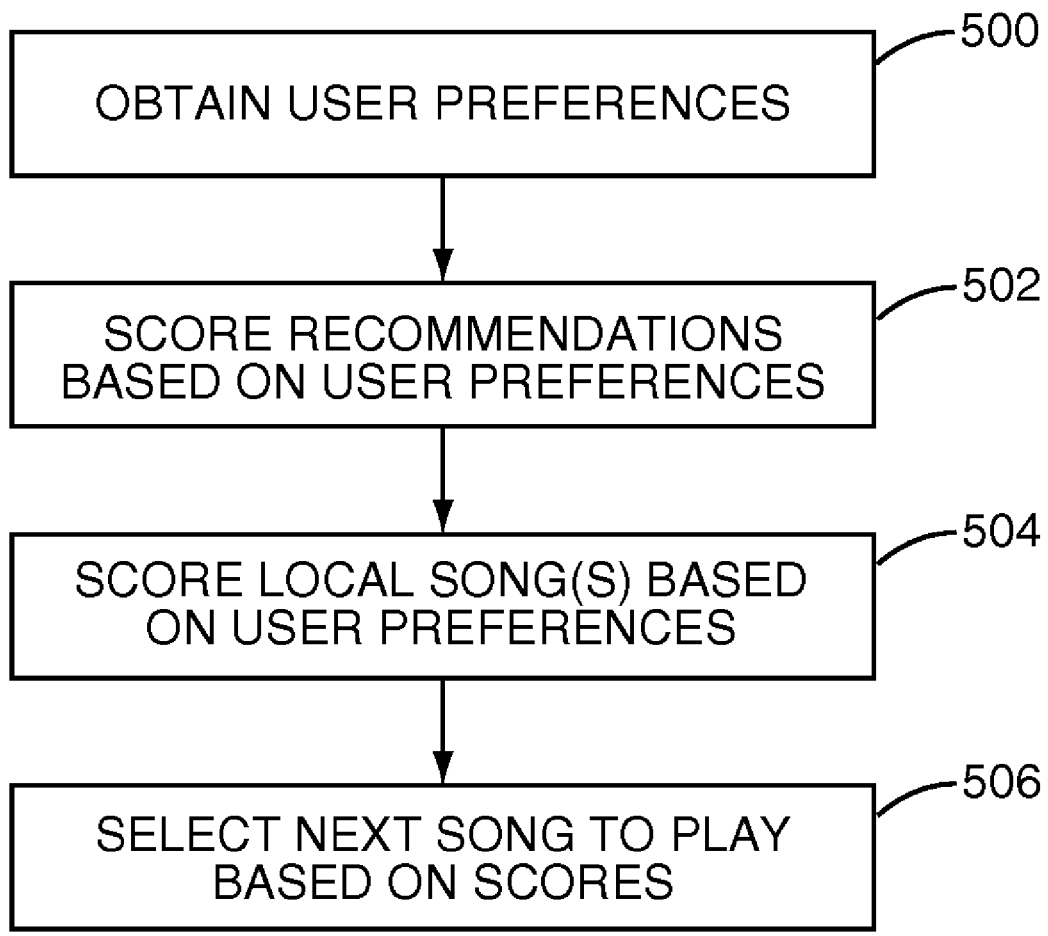
FIG. 6 is a flow chart illustrating a method for automatically selecting media to play based on recommendations from peer devices and user preferences according to one embodiment of the present invention.

FIG. 6 illustrates the process of automatically selecting a song to play from the received recommendations and locally stored songs at the peer device 12' according to one embodiment of the present invention. However, the following discussion is equally applicable to the peer devices 12-16 of FIG. 1, as well as the other peer devices 14'-16' of FIG. 4. First, the user preferences for the user of the peer device 12' are obtained (step 500). The user preferences may include a weight or priority assigned to each of a number of categories such as, but not limited to, user, genre, decade of release, and availability. The user preferences may be obtained from the user during an initial configuration of the recommendation engine 24'. In addition, the user preferences may be updated by the user as desired. The user preferences may alternatively be suggested by the recommendation engine 24' or the proxy server 40 based on a play history of the peer device 12'. Note that that proxy server 40 may ascertain the play history of the peer device 12' by monitoring the recommendations from the peer device 12' as the recommendations pass through the proxy server 40 on their way to the other peer devices 14'-16'. The user preferences may be stored locally at the peer device 12' or obtained from a central server, such as the proxy server 40, via the network 20.

Once recommendations are received from the other peer devices 14'-16', the recommendation engine 24' of the peer device 12' scores the songs identified by the recommendations based on the user preferences (step 502). The recommendation engine 24' also scores one or more local songs from the music collection 26' (step 504). The recommendation engine 24' then selects the next song to play based, at least on part, on the scores of the recommended and local songs (step 506).

Figure 7:
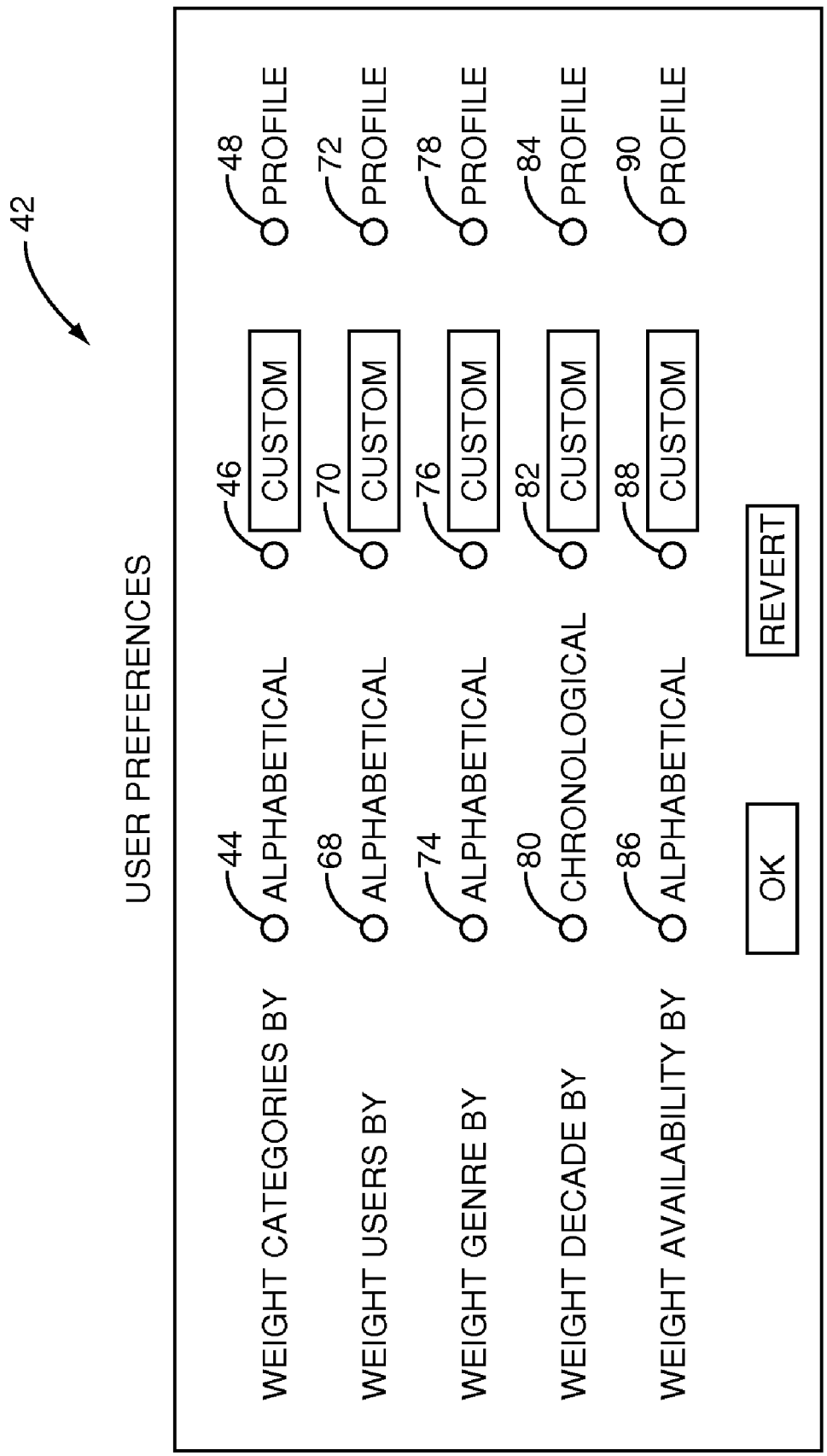
FIG. 7 illustrates an exemplary graphical user interface (GUI) for configuring user preferences according to one embodiment of the present invention.
Figure 8:
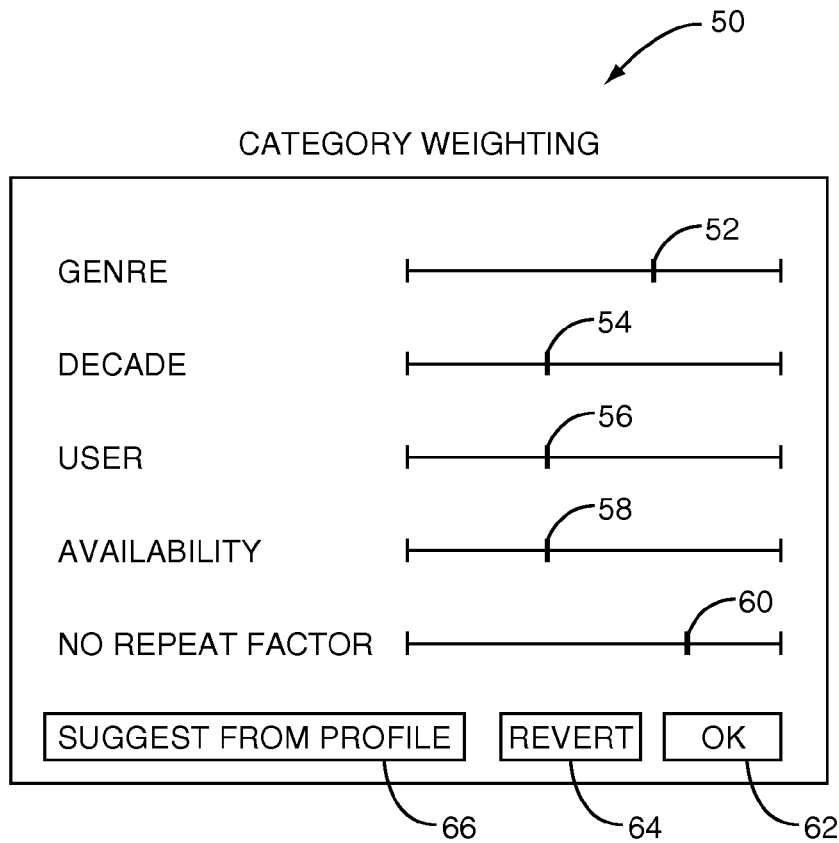
FIG. 8 illustrates an exemplary GUI for assigning weights to various categories of media content as part of configuring the user preferences according to one embodiment of the present invention.

FIG. 7 illustrates an exemplary graphical user interface (GUI) 42 for configuring user preferences. First, the user assigns a weight to various categories. In this example, the categories are users, genre, decade, and availability. However, the present invention is not limited thereto. The weights for the categories may be assigned alphabetically by selecting radio button 44, customized by the user by selecting radio button 46, or automatically suggested based on a user profile of the user by selecting radio button 48. If alphabetical weighting is selected, the weights are assigned by alphabetically sorting the categories and assigning a weight to each of the categories based on its position in the alphabetically sorted list of categories. As illustrated in FIG. 8, if customized weighting is selected, the user may be presented with a GUI 50 for customizing the weighting of the categories. As illustrated in the exemplary embodiment of FIG. 8, the weights of the categories may be assigned by adjusting corresponding sliding bars 52-58. Sliding bar 60 may be adjusted to assign a weight to a "no repeat factor." The no repeat factor is a dampening factor used to alter a song's score based on when the song was previously played at the peer device 12' in order to prevent the same song from being continually repeated.

Once the weights are assigned, the user may select an OK button 62 to return to the GUI 42 of FIG. 7 or select a REVERT button 64 to return the weights of the categories to their previous settings. In addition, the user may select a SUGGEST FROM PROFILE button 66 to have the recommendation engine 24' or the proxy server 40 suggest weights for the categories based on a user profile. Note that the button 66 has the same effect as the radio button 48 of FIG. 7.

Returning to FIG. 7, radio buttons 68-72 are used to select a desired method for assigning weights to each user in the P2P network, radio buttons 74-78 are used to select a desired method for assigning weights to each of a number of genres of music, radio buttons 80-84 are used to select the desired method for assigning weights to each of a number of decades, and radio buttons 86-90 are used to select the desired method for assigning weights to a number of song availability types.

Figure 9:
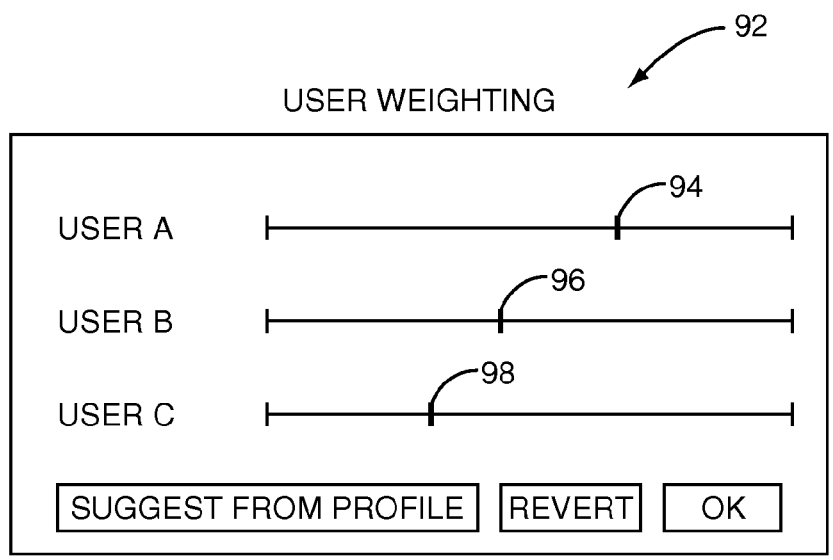
FIG. 9 illustrates an exemplary GUI for assigning weights to individual users within a user category as part of configuring the user preferences according to one embodiment of the present invention.

Regarding users, if the radio button 68 is selected, the users are assigned weights based on their respective positions in an alphabetically sorted list of users. If the radio button 70 is selected, a GUI 92 (FIG. 9) enabling the user to customize the weights assigned to a number of users from which recommendations are received. An exemplary embodiment of the GUI 92 is illustrated in FIG. 9, where sliding bars 94-98 enable the user to assign customized weights to corresponding users. Returning to FIG. 7, if the radio button 72 is selected, the recommendation engine 24' or the proxy server 40 generates suggested weights for the users based on a user profile associated with the peer device 12'.

Figure 10:
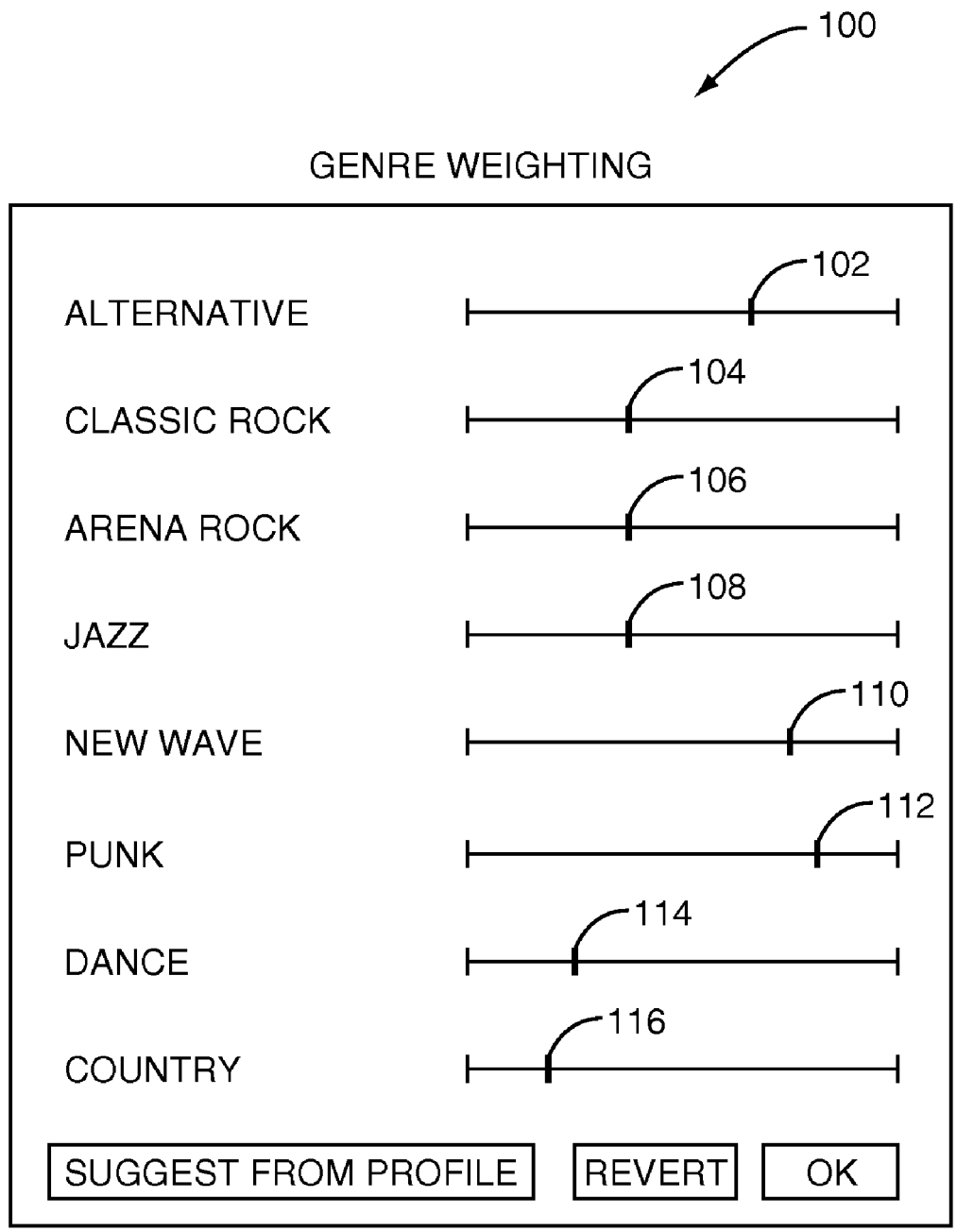
FIG. 10 illustrates an exemplary GUI for assigning weights to individual genres from a genre category as part of configuring the user preferences according to one embodiment of the present invention.

Regarding genres, if the radio button 74 is selected, the genres are assigned weights based on their respective positions in an alphabetically sorted list of genres. If the radio button 76 is selected, a GUI 100 (FIG. 10) enabling the user to customize the weights assigned to a number of genres. An exemplary embodiment of the GUI 100 is illustrated in FIG. 10, where sliding bars 102-116 enable the user to assign customized weights to corresponding genres. Returning to FIG. 7, if the radio button 78 is selected, the recommendation engine 24' or the proxy server 40 generates suggested weights for the genres based on a user profile associated with the peer device 12'.

Figure 11:
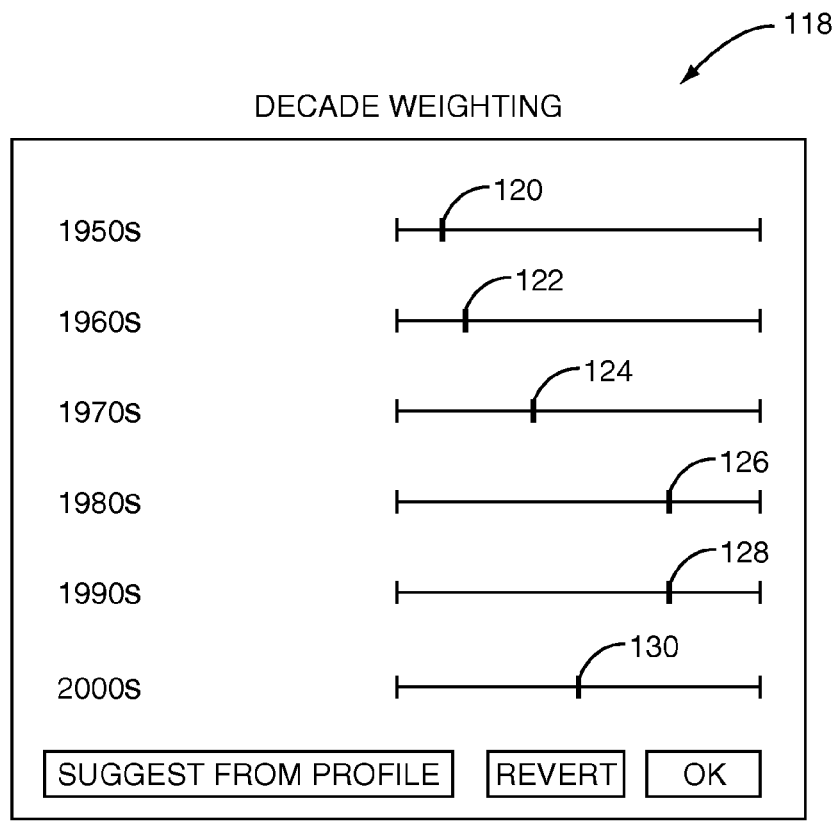
FIG. 11 illustrates an exemplary GUI for assigning weights to individual decades from a decade category as part of configuring the user preferences according to one embodiment of the present invention.

Regarding decades, if the radio button 80 is selected, the decades are assigned weights based on their respective positions in a chronologically sorted list of decades. If the radio button 82 is selected, a GUI 118 (FIG. 11) enabling the user to customize the weights assigned to a number of decades. An exemplary embodiment of the GUI 118 is illustrated in FIG. 11, where sliding bars 120-130 enable the user to assign customized weights to corresponding decades. Returning to FIG. 7, if the radio button 84 is selected, the recommendation engine 24' or the proxy server 40 generates suggested weights for the decades based on a user profile associated with the peer device 12'.

Figure 12:
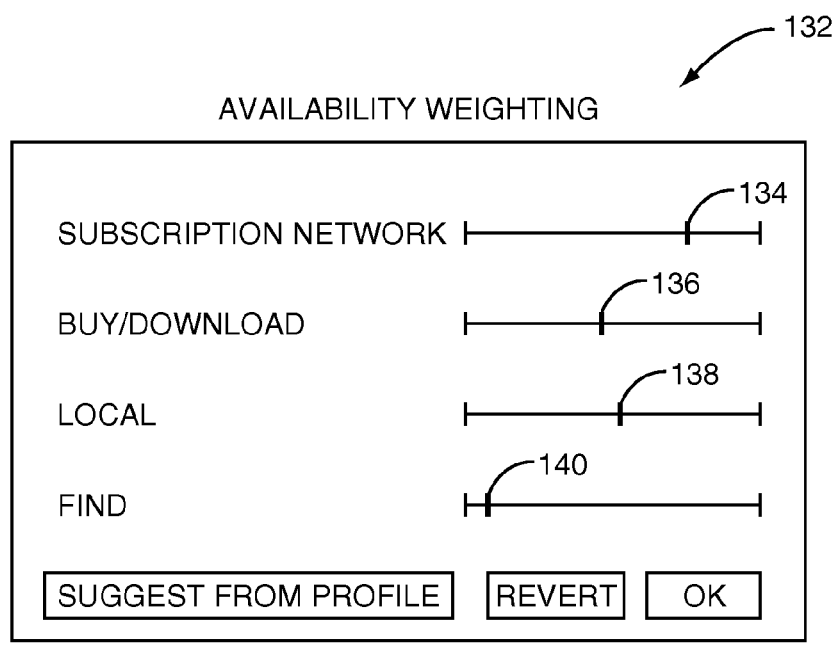
FIG. 12 illustrates an exemplary GUI for assigning weights to individual availability types from an availability type category as part of configuring the user preferences according to one embodiment of the present invention.

Regarding availability, if the radio button 86 is selected, the availability types are assigned weights based on their respective positions in an alphabetically sorted list of availability types. If the radio button 88 is selected, a GUI 132 (FIG. 12) enabling the user to customize the weights assigned to a number of availability types. An exemplary embodiment of the GUI 132 is illustrated in FIG. 12, where sliding bars 134-140 enable the user to assign customized weights to corresponding availability types. Returning to FIG. 7, if the radio button 90 is selected, the recommendation engine 24' or the proxy server 40 generates suggested weights for the availability types based on a user profile associated with the peer device 12'.

An exemplary equation for scoring a particular song is:

$$Score = NRF \cdot (WU \cdot WUA + WG \cdot WGA + WD \cdot WDA + WA \cdot WAA) \cdot 100,$$

where NRF is the "no repeat factor"; WU is the weight assigned to the user category; WUA is the weight assigned to the user attribute of the song, which is the user recommending the song; WG is the weight assigned to the genre category; WGA is the weight assigned to the genre attribute of the song, which is the genre of the song; WD is the weight assigned to the decade category; WDA is the weight assigned to the decade attribute of the song, which is the decade in which the song or the album associated with the song was released; WA is the weight assigned to the availability category; and WAA is the weight assigned to the availability attribute of the song, which is the availability of the song.

The NRF may, for example, be computed as:

$$NRF = \frac{MIN(10 \cdot NRFW, LASTREPEAT\_INDEX)}{10 \cdot NRFW}.$$

As an example, assume that the following category weights have been assigned:

| | |
|---|---|
| User Category | 1 |
| Genre Category | 7 |
| Decade Category | 7 |
| Availability Type Category | 5 |
| NRFW | 9 |

Further assume that the attributes for the categories have been assigned weights as follows:

| User | | Genre | | Decade | | Availability | |
|---|---|---|---|---|---|---|---|
| User A | 5 | Alternative | 8 | 1950s | 2 | Local | 8 |
| User B | 5 | Classic Rock | 5 | 1960s | 4 | Subscription Network | 2 |
| User C | 5 | Arena Rock | 5 | 1970s | 7 | Buy/Download | 1 |
| | | Jazz | 5 | 1980s | 9 | Find | 1 |
| | | New Wave | 2 | 1990s | 5 | | |
| | | Punk | 4 | 2000s | 5 | | |
| | | Dance | 2 | | | | |
| | | Country | 2 | | | | |

Thus, if a particular song to be scored is recommended by the user "User C," is from the "Alternative Genre," is from the "1980s" decade, and is available from the subscription music service 18, the score of the song may be computed as:

$$\text{Score} = NRF \cdot \left( \frac{1}{20} \cdot \frac{5}{10} + \frac{7}{20} \cdot \frac{8}{10} + \frac{7}{20} \cdot \frac{9}{10} + \frac{5}{20} \cdot \frac{2}{10} \right) \cdot 100$$

where if the song was last played 88 songs ago, $$NRF = \frac{\text{MIN}(10 \cdot 9, 88)}{10 \cdot 9} = \frac{88}{90}.$$

Thus, the score for the song is $$\text{Score} = \frac{88}{90} \cdot \left( \frac{1}{20} \cdot \frac{5}{10} + \frac{7}{20} \cdot \frac{8}{10} + \frac{7}{20} \cdot \frac{9}{10} + \frac{5}{20} \cdot \frac{2}{10} \right) \cdot 100 = 65.5.$$

FIG. 13 is an exemplary GUI 142 showing a playlist for the peer device 12' including both local and recommended songs according to the present invention. However, note that a similar list may be maintained internally by the peer device 12 of FIG. 1 and potentially optimized to display at least a portion of the GUI 142 on the display of the peer device 12. In this example, both the local and recommended songs are scored, as described above, and sorted according to their scores. In addition, as illustrated in FIG. 14, the songs may be sorted based on another criterion, which in the illustrated example is genre, and score.

The GUI 142 may optionally allow the user to block songs having particular identified fields. In the examples of FIGS. 13 and 14, the user has identified the genre "country" and the artist "iron maiden" as fields to be blocked, as illustrated by the underlining. The user may select fields to block by, for example, clicking on or otherwise selecting the desired fields. Songs having the blocked fields are still scored but are not obtained or played by the peer device 12'.

In one embodiment, the recommendation engine 24' of the peer device 12' may provide a download queue containing all songs to be downloaded, and optionally purchased, from an external source such as the subscription music service 18, an e-commerce service, or another peer device 14'-16'. Songs in the download queue having scores above a first predetermined or user defined threshold and previews of other songs in the download queue having scores above a second predetermined or user defined threshold but below the first threshold may be automatically downloaded to the peer device 12'.

Figure 15:
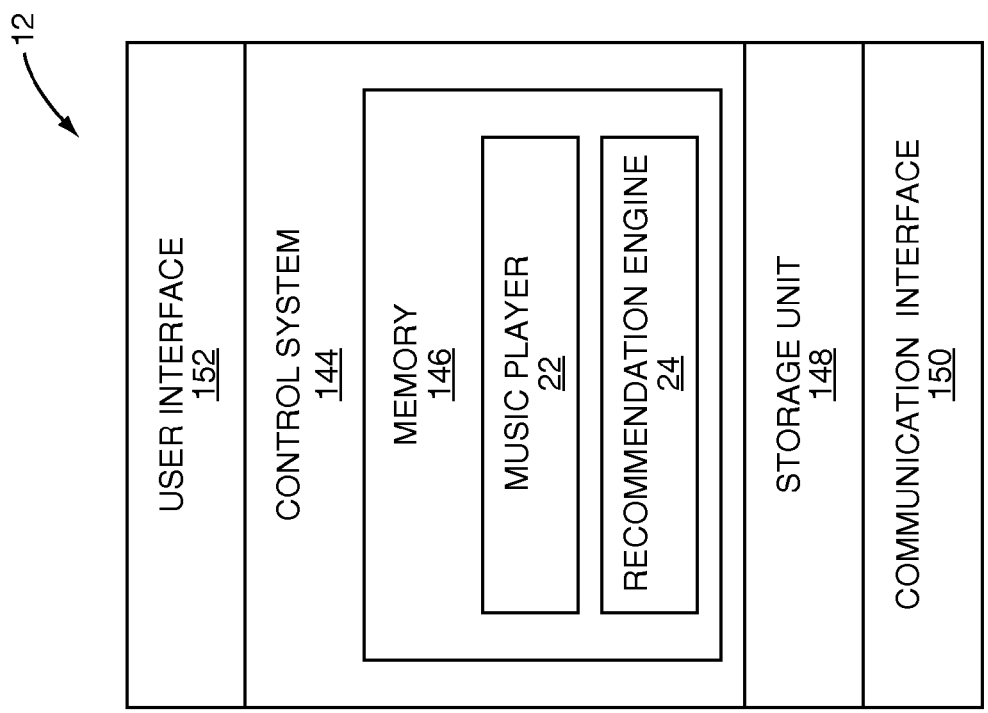
FIG. 15 is a block diagram of a peer device of FIG. 1 according to one embodiment of the present invention.

FIG. 15 is a block diagram of an exemplary embodiment of the peer device 12 of FIG. 1. However, the following discussion is equally applicable to the other peer devices 14, 16. In general, the peer device 12 includes a control system 144 having associated memory 146. In this example, the music player 22 and the recommendation engine 24 are at least partially implemented in software and stored in the memory 146. The peer device 12 also includes a storage unit 148 operating to store the music collection 26 (FIG. 1). The storage unit 148 may be any number of digital storage devices such as, for example, one or more hard-disc drives, one or more memory cards, RAM, one or more external digital storage devices, or the like. The music collection 26 may alternatively be stored in the memory 146. The peer device 12 also includes a communication interface 150. The communication interface 150 includes a local wireless communication interface for establishing the P2P network with the other peer devices 14, 16. The local wireless interface may operate according to, for example, one of the suite of IEEE 802.11 standards, the Bluetooth standard, or the like. The communication interface 150 may also include a network interface communicatively coupling the peer device 12 to the network 20 (FIG. 1). The peer device 12 also includes a user interface 152, which may include components such as a display, speakers, a user input device, and the like.

Figure 16:
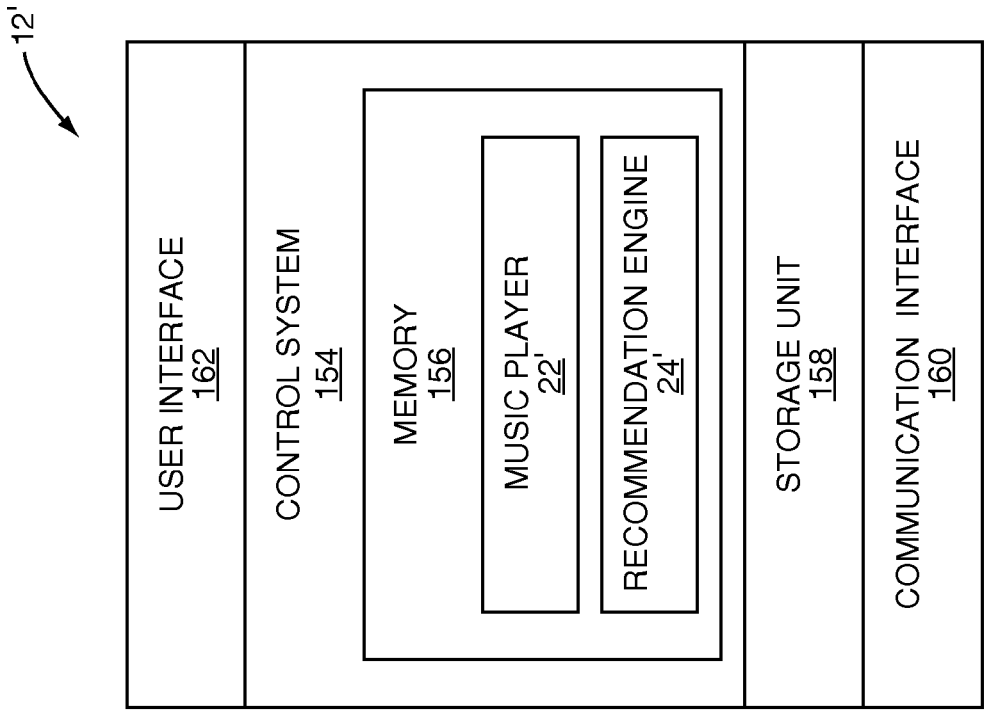
FIG. 16 is a block diagram of a peer device of FIG. 4 according to one embodiment of the present invention.

FIG. 16 is a block diagram of an exemplary embodiment of the peer device 12' of FIG. 4. However, the following discussion is equally applicable to the other peer devices 14'-16'. In general, the peer device 12' includes a control system 154 having associated memory 156. In this example, the music player 22' and the recommendation engine 24' are at least partially implemented in software and stored in the memory 156. The peer device 12' also includes a storage unit 158 operating to store the music collection 26' (FIG. 4). The storage unit 158 may be any number of digital storage devices such as, for example, one or more hard-disc drives, one or more memory cards, RAM, one or more external digital storage devices, or the like. The music collection 26' may alternatively be stored in the memory 156. The peer device 12' also includes a communication interface 160. The communication interface 160 includes a network interface communicatively coupling the peer device 12' to the network 20 (FIG. 4). The peer device 12' also includes a user interface 162, which may include components such as a display, speakers, a user input device, and the like.

Figure 17:
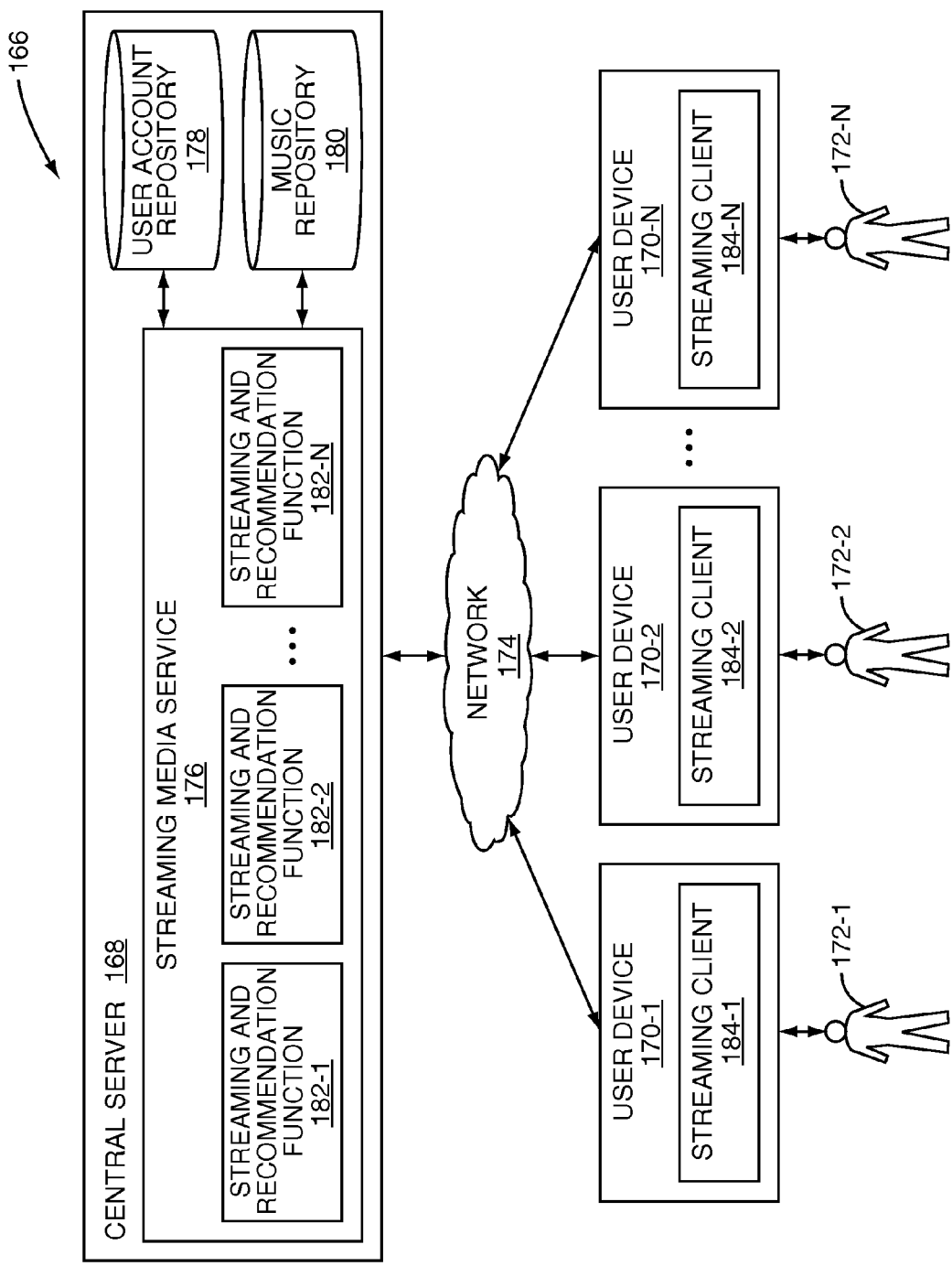
FIG. 17 illustrates a system for providing P2P media recommendations according to another embodiment of the present invention.

FIG. 17 illustrates a system 166 for providing P2P media recommendations according to another embodiment of the present invention. In general, the system 166 includes a central server 168 and a number of user devices 170-1 through 170-N having associated users 172-1 through 172-N. The central server 168 and the user devices 170-1 through 170-N are connected via a network 174 such as, for example, the Internet. However, the present invention is not limited thereto. The network 174 may be any type of Wide Area Network (WAN), Local Area Network (LAN), or the like, or any combination thereof. Still further, the network 174 may include wired components, wireless components, or a combination thereof. Note that while a single central server 168 is illustrated for clarity and ease of discussion, it will be readily apparent to one having ordinary skill in the art upon reading this disclosure that the system 166 may include multiple central servers 168 for purposes of load balancing and redundancy.

The central server 168 includes a streaming media service 176, a user account repository 178, and a music repository 180. The streaming media service 176 may be implemented in software, hardware, or a combination thereof. In general, as discussed below, the streaming media service 176 provides streaming of songs from the music repository 180 to the user devices 170-1 through 170-N. In addition, the streaming media service 176 exchanges P2P song recommendations between the users 172-1 through 172-N in a manner similar to that discussed above. Again, note that while the discussion herein focuses on songs and song recommendations, the present invention is not limited thereto. Other types of media presentations may also be used.

The user account repository 178 includes a user account for each of the users 172-1 through 172-N. Using the user 172-1 as an example, the user account of the user 172-1 includes a list of friends, or contacts, of the user 172-1. The "friends" of the user 172-1 are other users from the users 172-2 through 172-N that have been identified as friends or contacts of the user 172-1. Note that the manner in which the friends of the user 172-1 are identified is not central to the present invention. Any appropriate manual or automated technique may be used. For example, an invitation process may be used. As another example, a profile matching process may be used to select other users having user profiles (e.g., demographics, user preferences, play histories, or the like) similar to that of the user 172-1 as friends of the user 172-1. In addition, the user account of the user 172-1 includes user preferences of the user 172-1. As discussed above, in one embodiment, the user preferences of the user 172-1 include weights assigned to each of a number of categories (e.g., genre, decade, recommending user, availability, or the like) and, for each category, weights assigned to a number of attributes within that category (e.g., for the genre category, Rock, Metal, Alternative, Country, Bluegrass, Jazz, or the like). The user account of the user 172-1 may also include a user profile of the user 172-1. The user profile may include demographic information describing the user 172-1, a play history of the user 172-1, information identifying media items in a media collection of the user 172-1 stored on the user device 170-1, statistical information describing the media items in the media collection of the user 172-1, or the like.

The music repository 180 includes a number of songs available for streaming to the user devices 170-1 through 170-N. In addition, the music repository 180 includes metadata describing each of the songs. The metadata for a song may include, for example, a title of the song, an artist of the song, an album on which the song was released, a date of release, a genre of the song, or the like.

In this embodiment, the streaming media service 176 includes a number of streaming and recommendation functions 182-1 through 182-N corresponding to the users 172-1 through 172-N. Thus, for example, the streaming and recommendation function 182-1 serves the user 172-1, the streaming and recommendation function 182-2 serves the user 172-2, etc. Note that the streaming and recommendation functions 182-1 through 182-N are exemplary and are not intended to limit the scope of the present invention. Numerous alternative embodiments of the streaming media service 176 will be apparent to one having ordinary skill in the art upon reading this disclosure. In general, the streaming and recommendation functions 182-1 through 182-N operate to stream songs to the corresponding user devices 170-1 through 170-N. In addition, the streaming and recommendation functions 182-1 through 182-N send, receive, and process song recommendations as discussed below.

Each of the user devices 170-1 through 170-N may be, for example, a personal computer, a portable media player having network capabilities, a mobile smart phone having media playback capabilities, a set-top box, a gaming console having network and media playback capabilities, or the like. The user devices 170-1 through 170-N include streaming clients 184-1 through 184-N, respectively. The streaming clients 184-1 through 184-N may be implemented in software, hardware, or a combination thereof. In general, the streaming media clients 184-1 through 184-N provide playback of streaming songs received from the central server 168. In addition, the streaming media clients 184-1 through 184-N enable the users 172-1 through 172-N to take desired actions during playback such as pausing, fast-forwarding, rewinding, skipping from one song to another, or the like.

Figure 18:
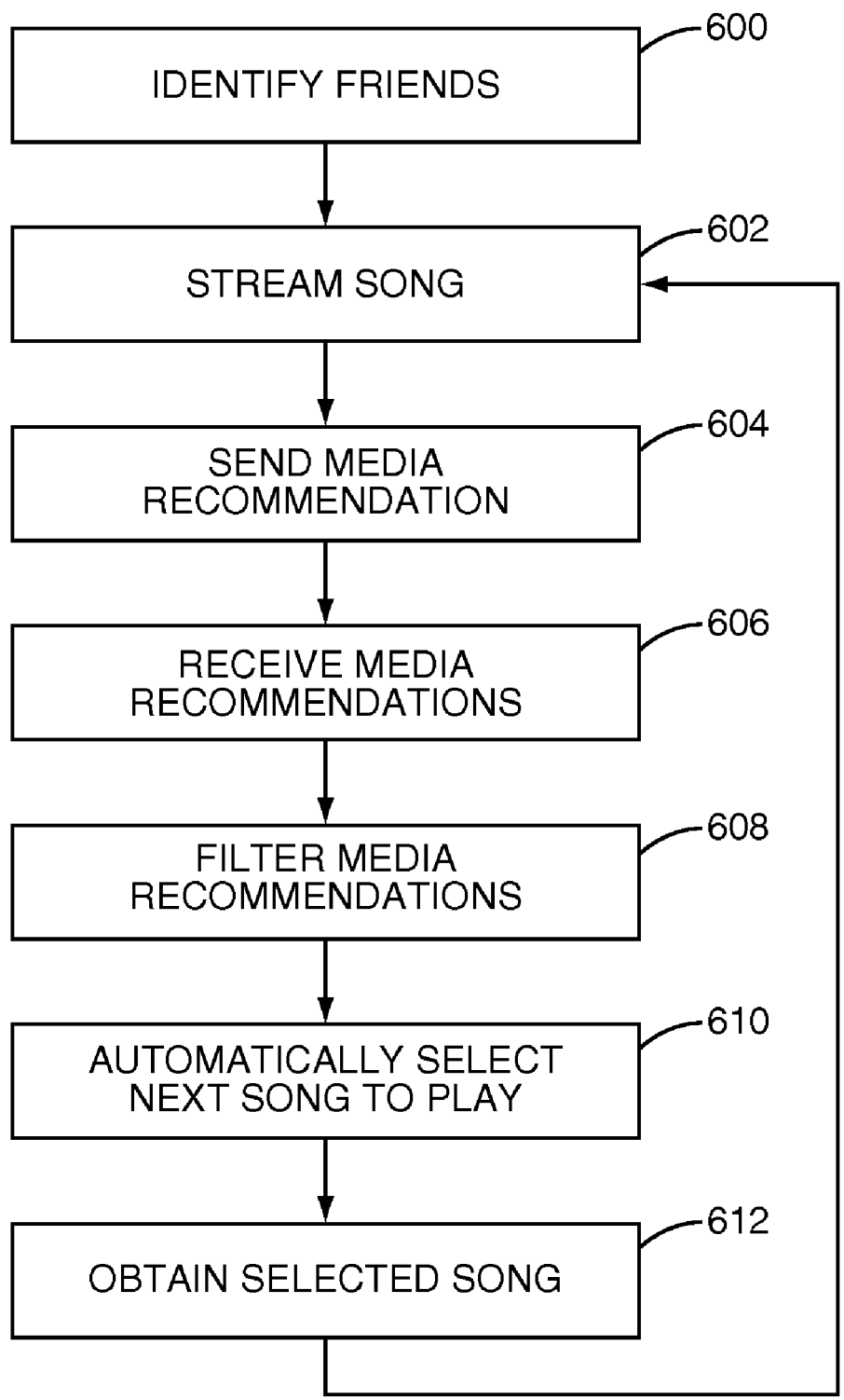
FIG. 18 is a flow chart illustrating the operation of a streaming and recommendation function of the central media service of FIG. 17 according to one embodiment of the present invention.

FIG. 18 is a flow chart illustrating the operation of the streaming and recommendation function 182-1 according to one embodiment of the present invention. This discussion is equally applicable to the other streaming and recommendation functions 182-2 through 182-N. First, the streaming and recommendation function 182-1 identifies friends of the user 172-1 (step 600). The friends of the user 172-1 may be manually identified by the user 172-1 using, for example, an invitation process. Alternatively, the friends of the user 172-1 may be identified via an automatic process. For example, the streaming and recommendation function 182-1 may identify other users having user profiles (e.g., demographic information) and/or user preferences that match that of the user 172-1 to at least a threshold degree as friends for the user 172-1.

Next, the streaming and recommendation function 182-1 streams a song to the user device 170-1 of the user 172-1 (step 602). In the preferred embodiment, the streaming and recommendation function 182-1 maintains a list of songs, such as a playlist, for the user 172-1. As discussed above, the list of songs includes songs identified by song recommendations received from other users identified as friends of the user 172-1. In addition, the list of songs may include one or more songs selected by the user 172-1. Still further, the list may include one or more songs selected or recommended by the streaming media service 176 such as, for example, the Top 10 songs from the Billboard charts, one or more of the songs most played by the users 172-1 through 172-N, or the like. Thus, for this first iteration, the user 172-1 may select a song from the list to play. In response, the streaming and recommendation function 182-1 begins streaming the selected song to the user device 170-1 of the user 172-1 for playback.

In response to streaming the song to the user device 170-1 and playback of the song at the user device 170-1, the streaming and recommendation function 182-1 sends a song recommendation identifying the song to one or more other users identified as friends of the user 172-1 (step 604). The song recommendation includes information identifying the song such as, for example, a GUID of the song, a reference (e.g., URL) to the song in the music repository 180, a title of the song, or the like. The streaming and recommendation function 182-1 may send the recommendation substantially immediately and automatically upon initiation of playback of the song, upon completion of playback of a threshold amount of the song, or after completion of playback of the song.

In one embodiment, in order to send the song recommendation to the other users identified as friends of the user 172-1, the streaming and recommendation function 182-1 sends the song recommendation to corresponding ones of the streaming and recommendation functions 182-2 through 182-N. In another embodiment, the streaming and recommendation function 182-1 stores the song recommendations in corresponding data structures maintained for the users identified as friends of the user 172-1. For example, if the user 172-2 is identified as a friend of the user 172-1, the song recommendation may be stored in a list of received song recommendations maintained for the user 172-2 in, for example, the user account of the user 172-2. This list of received song recommendations may thereafter be processed by the streaming and recommendation function 182-2 associated with the user 172-2.

In this example, while streaming the song to the user device 170-1 of the user 172-1, the streaming and recommendation function 182-1 receives one or more song recommendations from one or more other users identified as friends of the user 172-1 (step 606). More specifically, song recommendations are automatically sent to the user 172-1 in response to playback of corresponding songs by the users identified as friends of the user 172-1. Again, the song recommendations may be provided directly to the streaming and recommendation function 182-1 or stored in a data structure associated with the user 172-1. After receiving the song recommendations, the streaming and recommendation function 182-1 may optionally filter the song recommendations based on, for example, user, genre, artist, title, album, lyrics, date of release, or the like (step 608).

Based on the user preferences of the user 172-1, the streaming and recommendation function 182-1 then automatically selects a next song to play from a group of songs including the songs identified by the song recommendations received in step 606, or the song recommendations that were not filtered or removed if the filtering step 608 is performed (step 610). The group of songs may be only the songs identified by the song recommendations received in step 606 or the song recommendations resulting from the filtering step 608 if filtering is performed. In another embodiment, the group of songs includes the songs identified by the song recommendations received in step 606 or resulting from the filtering step 608 and one or more of the following: one or more songs identified by previous song recommendations sent to the user 172-1, one or more songs identified by the user 172-1, one or more songs selected or recommended by the media service 176, or the like. Further, in the preferred embodiment, the group of songs is maintained as a list of songs such as, for example, a play list. Note that if previous song recommendations are considered, previous song recommendations may expire, and therefore no longer be considered, after a defined amount of time has lapsed since the song recommendations were received.

As discussed above, the user preferences used to select the next song to play may include a weight or priority assigned to each of a number of categories such as user, genre, decade of release, and availability. Generally, in this embodiment, availability identifies whether the user 172-1 has access rights to the corresponding song. For example, availability may refer to whether songs are available to the user 176-1 for free or for some fee (e.g., purchase fee, subscription fee, or the like).

In the preferred embodiment, the next song to play is selected by first scoring the songs in the group of songs associated with the user 172-1 based on the user preferences of the user 172-1 and then selecting the song having the highest or most preferred score as the next song to play. Once the next song to play is selected, the streaming media service 176 obtains the next song from the music repository 180 (step 612). At this point, the process returns to step 602 such that the streaming and recommendation function 182-1 begins streaming the next song to the user device 170-1 of the user 172-1. Steps 602 through 612 are repeated until the playback session is terminated.

Figure 19:
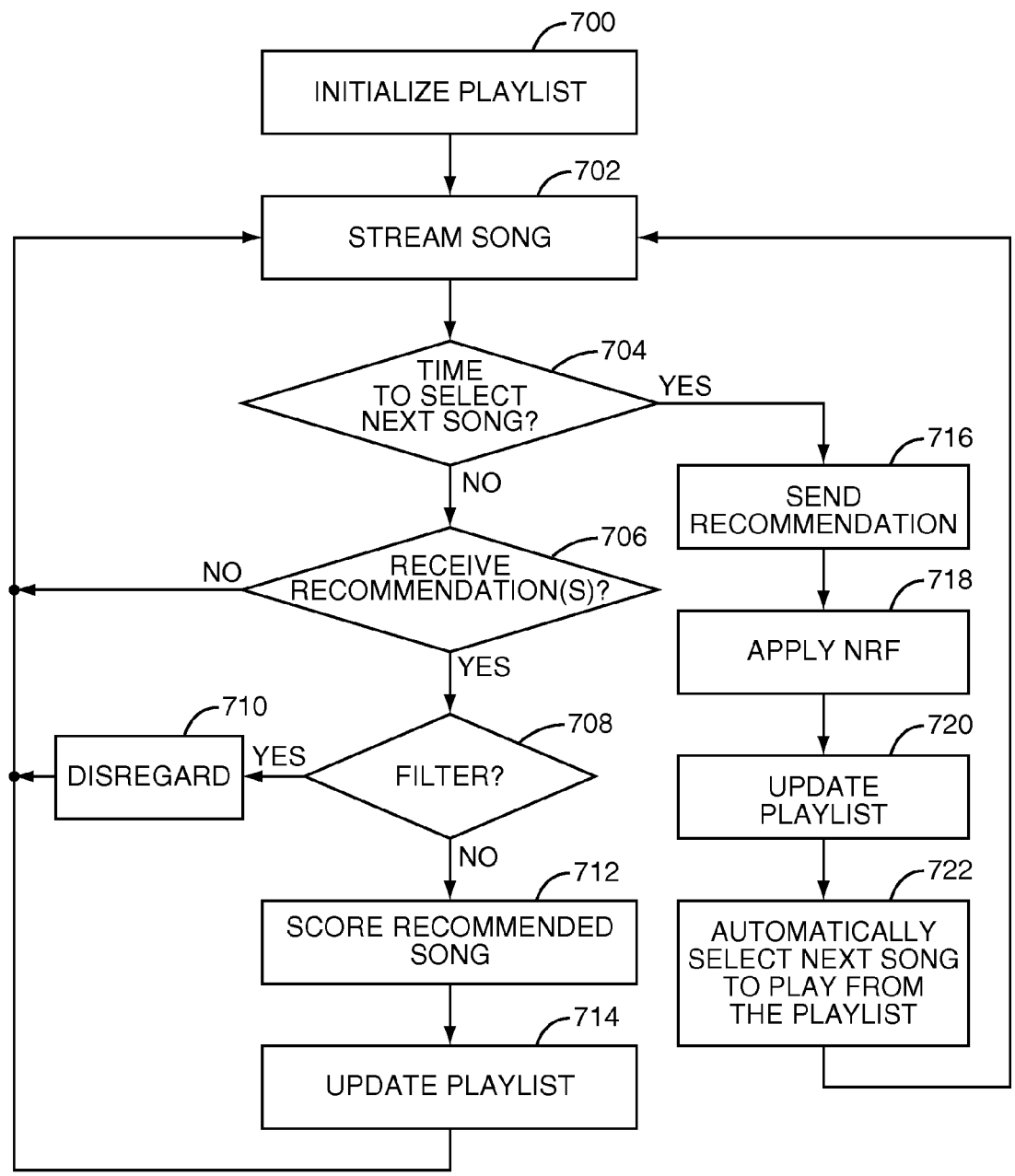
FIG. 19 is a more detailed flow chart illustrating the operation of the streaming and recommendation function of the central media service of FIG. 17 according to one embodiment of the present invention.

FIG. 19 is a more detailed flow chart illustrating the operation of the streaming and recommendation function 182-1 according to an exemplary embodiment of the present invention. First, a playlist for the user 172-1 is initialized (step 700). In this embodiment, the playlist may be initialized with one or more songs selected by the user 172-1, one or more songs selected or recommended by the streaming media service 176, one or more songs previously recommended to the user 172-1 by other users identified as friends of the user 172-1, or the like. Further, in this exemplary embodiment, the songs in the playlist are scored based on the user preferences of the user 172-1, and the playlist is sorted based on the scores of the songs. Note that in an alternative embodiment, the playlist may be initialized as an empty playlist.

Next, assuming that the playlist is not initialized to an empty playlist, the streaming and recommendation function 182-1 begins streaming a select song from the playlist to the user device 170-1 of the user 172-1 for playback (step 702). In this exemplary embodiment, the select song may be a first song in the playlist, which is the song having the highest or most preferred score. The streaming and recommendation function 182-1 then determines whether it is time to select a next song to stream to the user device 170-1 of the user 172-1 for playback (step 704). A determination that it is time to select the next song to stream to the user device 170-1 may be made when, for example, a threshold amount of the current song has been streamed to and/or played by the user device 170-1 or when the user 172-1 chooses to skip to the next song.

If a determination is made that it is not time to select the next song, the streaming and recommendation function 182-1 then determines whether a song recommendation has been received on behalf of the user 172-1 (step 706). Note that while receipt and processing of a single song recommendation is discussed, multiple song recommendations may be received and processed at this time. Again, the song recommendations provided to the user 172-1 from other users identified as friends of the user 172-1 may be sent directly to the streaming and recommendation function 182-1 or stored in a data structure associated with the user 172-1 such as, for example, the user account of the user 172-1. If a song recommendation has not been received, then the process returns to step 702 such that the current song is continued to be streamed to the user device 170-1 of the user 172-1 and the process is repeated.

If a song recommendation has been received, then the streaming and recommendation function 182-1 optionally filters the song recommendation based on one or more filtering criteria such as, for example, artist, genre, date or decade of release, recommending user, or the like (step 708). If the song recommendation is to be filtered, then the streaming and recommendation function 182-1 disregards or discards the song recommendation (step 710), and the process then returns to step 702 and is repeated. If the song recommendation is not to be filtered, then the streaming and recommendation function 182-1 scores the song identified by the song recommendation based on the user preferences of the user 172-1 (step 712). The song recommendation function then updates the playlist of the user 172-1 to include an entry for the song identified by the song recommendation (step 714). When updating the playlist, the song identified by the song recommendation may be inserted into the playlist at a position determined based on the score of the song such that the playlist remains sorted based on the scores of the media items in the playlist. Alternatively, the song identified by the song recommendation may be inserted at any arbitrary location within the playlist. The playlist may then be sorted based on score. At this point, the process returns to step 702 and streaming of the current song is continued.

Note that if the user 172-1 does not have access rights to the song identified by the song recommendation that was added to the playlist, access rights to the song may be automatically obtained for the user 172-1 by, for example, charging a corresponding fee to an account of the user 172-1. Alternatively, if the user 172-1 does not have access rights, a preview of the song, rather than the song, may be added to the playlist.

Returning to step 704, once a determination is made that it is time to select the next song to be streamed to and played by the user device 170-1 of the user 172-1, the streaming and recommendation function 182-1 sends a song recommendation identifying the song to one or more other users identified as friends of the user 172-1 (step 716). Then, a no-repeat-factor (NRF) is applied to the song in order to decrease the score of the song as discussed above (step 718). The playlist is then updated (step 720). More specifically, in this embodiment, the no-repeat-factor and thus the scores of songs previously played are updated. The playlist is then resorted based on the updated scores of the song being played or just completed as well as the updated scores of songs previously played. The streaming and recommendation function 182-1 then automatically selects a song from the playlist having the highest or most preferential score as the next song to play (step 722). The process then returns to step 702 such that streaming of the next song begins, and the process is repeated.

Figure 20:
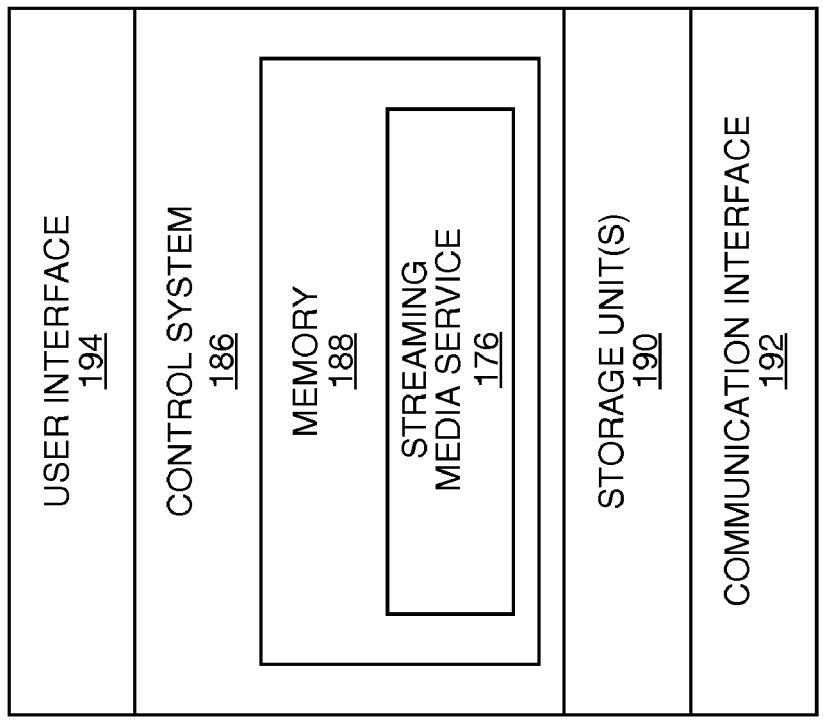
FIG. 20 is a block diagram of the central server of FIG. 17 according to one embodiment of the present invention.

FIG. 20 is a block diagram of the central server 168 of FIG. 17 according to one embodiment of the present invention. In general, the central server 168 includes a control system 186 having associated memory 188. In this example, the streaming media service 176 is implemented in software and stored in the memory 188. However, the present invention is not limited thereto. The streaming media service 176 may be implemented in software, hardware, or a combination thereof. The central server 168 also includes one or more storage units 190 such as, for example, one or more hard disk drives. In one embodiment, the user account repository 178 and the music repository 180 are stored in the one or more storage units 190. However, the present invention is not limited thereto. The central server 168 also includes a communication interface 192 communicatively coupling the central server 168 to the network 174 (FIG. 17). Lastly, the central server 168 may include a user interface 194, which may include components such as, for example, a display, one or more user input devices, or the like.

Figure 21:
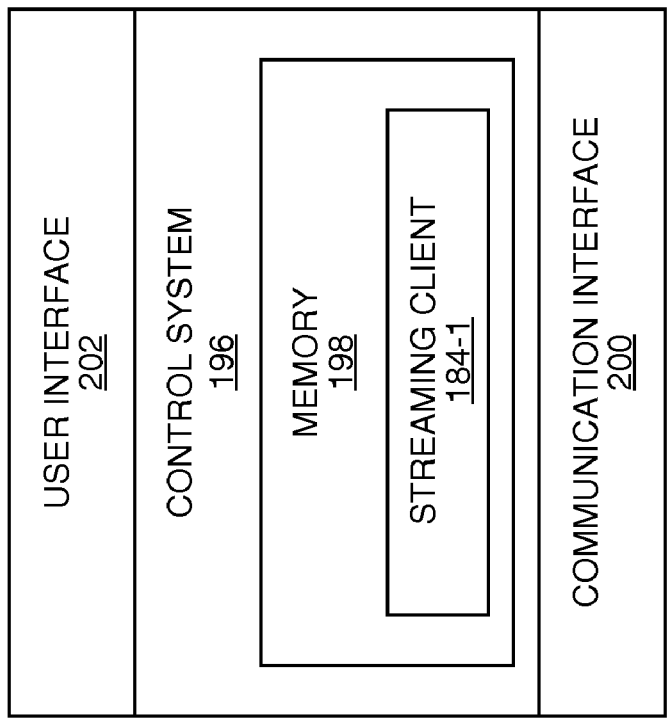
FIG. 21 is a block diagram of one of the user devices of FIG. 17 according to one embodiment of the present invention.

FIG. 21 is a block diagram of the user device 170-1 of FIG. 17 according to one embodiment of the present invention. This discussion is equally applicable to the other user devices 170-2 through 170-N. In general, the user device 170-1 includes a control system 196 having associated memory 198. In this example, the streaming client 184-1 is implemented in software and stored in the memory 198. However, the present invention is not limited thereto. The streaming media client 184-1 may be implemented in software, hardware, or a combination thereof. The user device 170-1 also includes a communication interface 200 communicatively coupling the user device 170-1 to the network 174 (FIG. 17). Lastly, the user device 170-1 includes a user interface 202, which may include components such as, for example, a display, one or more speakers, one or more user input devices, or the like.

The present invention provides substantial opportunity for variation without departing from the spirit or scope of the present invention. For example, while FIG. 1 illustrates the peer devices 12-16 forming the P2P network via local wireless communication and FIG. 4 illustrates the peer devices 12'-16' forming the P2P network via the network 20, the present invention is not limited to either a local wireless P2P network or a WAN P2P network in the alternative. More specifically, a particular peer device, such as the peer device 12, may form a P2P network with other peer devices using both local wireless communication and the network 20. Thus, for example, the peer device 12 may receive recommendations from both the peer devices 14, 16 (FIG. 1) via local wireless communication and from the peer devices 14'-16' (FIG. 4) via the network 20.

As another example, while the discussion herein focuses on song recommendations, the present invention is not limited thereto. The present invention is equally applicable to recommendations for other types of media presentations such as, for example, other types of audio presentations such as podcasts, audio books, or audio programs; video presentations such as movies, television programs, or user-generated video clips; or the like. Thus, the present invention may additionally or alternatively provide movie recommendations, television program recommendations, or the like.

Those skilled in the art will recognize improvements and modifications to the preferred embodiments of the present invention. All such improvements and modifications are considered within the scope of the concepts disclosed herein and the claims that follow.

What is claimed is:

1. A method of operation of a central streaming media service comprising:

streaming a media presentation to a user device of a first user for playback;

automatically providing a media recommendation identifying the media presentation to a second user in response to playback of the media presentation at the user device of the first user;

receiving the media recommendation on behalf of the second user;

making a determination as to whether the media recommendation is to be filtered based on one or more criterion; and if the determination is made not to filter the media recommendation:

automatically adding the media presentation identified by the media recommendation to a pre-existing list of media presentations maintained for the second user to provide an updated list of media presentations for the second user;

automatically selecting a select media presentation to stream to a user device of the second user from the updated list of media presentations for the second user based on user preferences of the second user; and streaming the select media presentation to the user device of the second user for playback in such a manner that enables playback of the select media presentation to begin upon completion of playback of the first media presentation;

wherein receiving the media recommendation comprises receiving the media recommendation during streaming of a first media presentation to the user device of the second user for playback.

2. The method of claim 1 wherein automatically providing the media recommendation comprises automatically providing the media recommendation identifying the media presentation to the second user upon initiation of playback of the media presentation at the user device of the first user.

3. The method of claim 1 wherein automatically providing the media recommendation comprises automatically providing the media recommendation identifying the media presentation to the second user upon completion of playback of a threshold amount of the media presentation at the user device of the first user.

4. The method of claim 1 wherein automatically providing the media recommendation comprises automatically providing the media recommendation identifying the media presentation to the second user upon completion of playback of the media presentation at the user device of the first user.

5. The method of claim 1 wherein automatically providing the media recommendation identifying the media presentation to the second user comprises automatically providing the media recommendation identifying the media presentation to a data structure associated with the second user.

6. The method of claim 1 wherein automatically providing the media recommendation identifying the media presentation to the second user comprises automatically providing the media recommendation identifying the media presentation to a component of the central streaming media service responsible for receiving media recommendations sent to the second user.

7. The method of claim 1 wherein the pre-existing list comprises one or more media presentations identified by a corresponding one or more media recommendations sent to the second user.

8. The method of claim 1 wherein the pre-existing list comprises one or more media presentations selected by the second user.

9. The method of claim 1 wherein the pre-existing list comprises one or more media presentations identified by the central streaming media service.

10. The method of claim 1 wherein the media presentation identified by the media recommendation is a song.

11. The method of claim 1 wherein the media presentation identified by the media recommendation is a video presentation.

12. The method of claim 1 wherein the media presentation identified by the media recommendation is an audio presentation.

13. The method of claim 1 wherein each media presentation in the pre-existing list of media presentations is scored, and the method further comprises:
    scoring the media presentation identified by the media recommendation based on the user preferences of the second user;
    wherein automatically selecting the select media presentation to stream to the user device of the second user comprises automatically selecting the select media presentation from the updated list of media presentations based on scores assigned to the media presentations, including the media presentation identified by the media recommendation, in the updated list of media presentations.

14. The method of claim 13 wherein the user preferences of the second user comprise weights assigned to a plurality of categories, and scoring the media presentation identified by the media recommendation comprises:
    identifying one of the plurality of categories applicable to the media presentation identified by the media recommendation; and
    scoring the media presentation identified by the media recommendation based on the weight assigned to the one of the plurality of categories.

15. The method of claim 14 wherein the plurality of categories comprises one or more categories selected from a group consisting of: recommending user, genre, decade, and availability.

16. The method of claim 14 wherein the user preferences of the second user further comprise weights assigned to a plurality of possible attributes for each of the plurality of categories, and scoring the media presentation identified by the media recommendation comprises:
    identifying one of the plurality of categories applicable to the media presentation identified by the media recommendation;
    identifying one of the plurality of possible attributes for the one of the plurality of categories applicable to the media presentation identified by the media recommendation; and
    scoring the media presentation identified by the media recommendation based on the weight assigned to the one of the plurality of categories and the weight assigned to the one of the plurality of possible attributes for the one of the plurality of categories.

17. The method of claim 14 wherein the user preferences of the second user further comprise weights assigned to a plurality of other users including the second user, and scoring the media presentation identified by the media recommendation comprises scoring the media presentation identified by the media recommendation based on a weight assigned to the second user.

18. The method of claim 14 wherein the user preferences of the second user further comprise weights assigned to a plurality of media presentation attributes, and scoring the media presentation identified by the media recommendation comprises:
    identifying one or more of the plurality of media presentation attributes applicable to the media presentation identified by the media recommendation; and
    scoring the media presentation identified by the media recommendation based on the weights assigned to the one or more of the plurality of media presentation attributes applicable to the media presentation identified by the media recommendation.

19. The method of claim 18 wherein the plurality of media presentation attributes comprises at least one of a group consisting of: a plurality of music genres and a plurality of time periods.

20. The method of claim 14 wherein automatically selecting the select media presentation from the updated list of media presentations based on the scores assigned to the media presentations, including the media presentation identified by the media recommendation, in the updated list of media presentations comprises:
    sorting the updated list of media presentations based on the scores to provide a sorted list of media presentations; and
    automatically selecting a media presentation from the sorted list of media presentations having a most preferred score as the select media presentation to stream to the user device of the second user for playback.

21. The method of claim 1 wherein the central streaming media service is a subscription-based service.

22. The method of claim 1 further comprising automatically obtaining rights for the second user to access the select media presentation if the second user does not have access rights to the select media presentation.

23. The method of claim 1 wherein streaming the select media presentation comprises:
    streaming a preview of the select media presentation to the user device of the second user if the second user does not have access rights to the select media presentation; and
    streaming a complete version of the select media presentation to the user device of the second user if the second user has access rights to the select media presentation.

24. A central server hosting a central streaming media service, comprising:
    a communication interface communicatively coupling the central server to a network; and
    a control system associated with the communication interface and adapted to:
    stream a media presentation to a user device of a first user via the network for playback;
    automatically provide a media recommendation identifying the media presentation to a second user in response to playback of the media presentation at the user device of the first user;
    receive the media recommendation on behalf of the second user;
    make a determination as to whether the media recommendation is to be filtered based on one or more criterion; and
    if the determination is made not to filter the media recommendation:
        automatically add the media presentation identified by the media recommendation to a pre-existing list of media presentations maintained for the second user to provide an updated list of media presentations for the second user;

automatically select a select media presentation to stream to a user device of the second user from the updated list of media presentations for the second user based on user preferences of the second user; and stream the select media presentation to the user device of the second user via the network for playback in such a manner that enables playback of the select media presentation to begin upon completion of playback of the first media presentation;

wherein receiving the media recommendation comprises receiving the media recommendation during streaming of a first media presentation to the user device of the second user for playback.

25. The central server of claim 24 wherein in order to automatically provide the media recommendation identifying the media presentation to the second user, the control system is adapted to automatically provide the media recommendation identifying the media presentation to a data structure associated with the second user.

26. The central server of claim 24 wherein in order to automatically provide the media recommendation identifying the media presentation to the second user, the control system is adapted to automatically provide the media recommendation identifying the media presentation to a component of the control system that automatically adds the media presentation identified by the media recommendation to the pre-existing list of media presentations maintained for the second user to provide the updated list of media presentations for the second user.

* * * * *